(12) United States Patent
Chakraborty et al.

(10) Patent No.: US 9,619,845 B2
(45) Date of Patent: Apr. 11, 2017

(54) SOCIAL NETWORK SYSTEM WITH CORRELATION OF BUSINESS RESULTS AND RELATIONSHIPS

(71) Applicant: Oracle International Corporation, Redwood Shores, CA (US)

(72) Inventors: Sayan Chakraborty, Niwot, CO (US); Andrew Kershaw, Louisville, CO (US)

(73) Assignee: Oracle International Corporation, Redwood Shores, CA (US)

( * ) Notice: Subject to any disclaimer, the term of this patent is extended or adjusted under 35 U.S.C. 154(b) by 668 days.

(21) Appl. No.: 13/716,779

(22) Filed: Dec. 17, 2012

(65) Prior Publication Data

US 2014/0172729 A1 Jun. 19, 2014

(51) Int. Cl.
*G06Q 10/00* (2012.01)
*G06Q 50/00* (2012.01)
*G06Q 10/06* (2012.01)

(52) U.S. Cl.
CPC ............ *G06Q 50/01* (2013.01); *G06Q 10/06* (2013.01)

(58) Field of Classification Search
CPC combination set(s) only.
See application file for complete search history.

(56) References Cited

U.S. PATENT DOCUMENTS

| 6,662,164 | B1 * | 12/2003 | Koppelman | ..... G06Q 10/06398 705/14.13 |
| 7,447,647 | B1 * | 11/2008 | Shedlack | ..................... 705/26.8 |
| 7,739,139 | B2 | 6/2010 | Robertson et al. | |
| 8,171,087 | B2 | 5/2012 | Carrer et al. | |
| 8,819,150 | B1 | 8/2014 | Osinga | |
| 9,253,137 | B1 | 2/2016 | Jackson | |
| 2004/0122803 | A1 * | 6/2004 | Dom et al. | ........................ 707/3 |
| 2004/0128285 | A1 | 7/2004 | Green | |
| 2005/0223058 | A1 | 10/2005 | Buchheit et al. | |
| 2006/0064434 | A1 * | 3/2006 | Gilbert et al. | ............. 707/104.1 |
| 2008/0103907 | A1 | 5/2008 | Maislos et al. | |
| 2008/0109741 | A1 | 5/2008 | Messing et al. | |
| 2008/0147487 | A1 | 6/2008 | Hirshberg | |

(Continued)

FOREIGN PATENT DOCUMENTS

WO 2009/120775 10/2009
WO 2009120775 A1 10/2009

(Continued)

OTHER PUBLICATIONS

A. Wable; "Intro to Facebook Search"; Mar. 16, 2010; http://www.facebook.com/note.php?note_id=365915113919.

(Continued)

*Primary Examiner* — Gabrielle McCormick
(74) *Attorney, Agent, or Firm* — Miles & Stockbridge P.C.

(57) ABSTRACT

A system that generates a social network and correlates business results within that social network receives, from an enterprise application, a business object, an associated system of record and corresponding enterprise members. The system generates a social object for the social network, where the social object corresponds to the business object. The system assigns social members to the social object and receives any changes to the business object. The system then correlates the change in the business object to each of the enterprise members and social members via the social object.

23 Claims, 17 Drawing Sheets

(56) References Cited

U.S. PATENT DOCUMENTS

| | | |
|---|---|---|
| 2009/0222448 A1 | 9/2009 | Caldwell et al. |
| 2009/0222750 A1 | 9/2009 | Jain et al. |
| 2009/0292526 A1 | 11/2009 | Harari |
| 2009/0305732 A1 | 12/2009 | Marcellino et al. |
| 2009/0307592 A1* | 12/2009 | Kalanithi et al. ............ 715/716 |
| 2010/0070485 A1 | 3/2010 | Parsons et al. |
| 2010/0082695 A1 | 4/2010 | Hardt |
| 2010/0169134 A1 | 7/2010 | Cheng et al. |
| 2010/0169159 A1 | 7/2010 | Rose et al. |
| 2010/0169327 A1 | 7/2010 | Lindsay et al. |
| 2010/0174747 A1 | 7/2010 | Farrell et al. |
| 2010/0198757 A1 | 8/2010 | Cheng et al. |
| 2010/0211917 A1 | 8/2010 | Tsuei |
| 2010/0318613 A1 | 12/2010 | Souza et al. |
| 2010/0325107 A1 | 12/2010 | Kenton et al. |
| 2011/0035677 A1 | 2/2011 | Vitale |
| 2011/0113072 A1 | 5/2011 | Lee |
| 2011/0113349 A1 | 5/2011 | Kiciman et al. |
| 2011/0137902 A1 | 6/2011 | Wable et al. |
| 2011/0161827 A1 | 6/2011 | Dedis et al. |
| 2011/0179025 A1 | 7/2011 | Chuang |
| 2011/0246920 A1 | 10/2011 | Lebrun |
| 2011/0314017 A1 | 12/2011 | Yariv et al. |
| 2012/0001919 A1 | 1/2012 | Lumer |
| 2012/0143972 A1 | 6/2012 | Malik et al. |
| 2012/0158501 A1 | 6/2012 | Zhang |
| 2012/0197809 A1* | 8/2012 | Earl et al. ............ 705/301 |
| 2012/0254902 A1 | 10/2012 | Brown |
| 2012/0290448 A1 | 11/2012 | England et al. |
| 2012/0290950 A1 | 11/2012 | Rapaport et al. |
| 2012/0331053 A1 | 12/2012 | Dunn et al. |
| 2013/0024511 A1 | 1/2013 | Dunn et al. |
| 2013/0024788 A1 | 1/2013 | Olsen et al. |
| 2013/0073280 A1* | 3/2013 | O'Neil ............ G06F 17/27 704/9 |
| 2013/0091217 A1 | 4/2013 | Schneider et al. |
| 2013/0097320 A1 | 4/2013 | Ritter |
| 2013/0166721 A1 | 6/2013 | Soffer |
| 2013/0173368 A1 | 7/2013 | Boutin et al. |
| 2013/0185143 A1 | 7/2013 | Damman et al. |
| 2013/0198275 A1 | 8/2013 | Forsblom et al. |
| 2013/0262595 A1 | 10/2013 | Srikrishna et al. |
| 2014/0012927 A1 | 1/2014 | Gertzfield et al. |
| 2014/0189524 A1 | 7/2014 | Murarka et al. |
| 2014/0189539 A1 | 7/2014 | St. Clair et al. |

FOREIGN PATENT DOCUMENTS

| | | |
|---|---|---|
| WO | 2011/163147 | 12/2011 |
| WO | 2011163147 A3 | 3/2012 |

OTHER PUBLICATIONS

About the Discussion Board; http:help.blackboard.com/instructor/content/_instructor_course/instructor_course_tool; last accessed on May 23, 2012.

Bing Search Quality Insights: Whole Page Relevance; http://www.bing.com/community/site_blogs/b/search/archive/2012/03/05/bing-search-quality-insights-whole-page-relevance.aspx; last downloaded Jun. 1, 2012.

The Oracle Text Scoring Algorithm; Oracle Text Reference; 11g Release 2 (11.2); http://docs.oracle.com/cd/E14072_01/text.112/e10944/ascore.htm; last downloaded Dec. 18, 2012.

Google Reader Sort on Unread Items; http://userscripts.org/scripts/show/12287; last accessed on May 23, 2012.

Groofer get group smart; "What is groofer"; http://www.groofer.com/what-is-groofer; last downloaded Jun. 1, 2012.

How do I mark a message as read or unread?—Facebook Help Center/Facebook; http://www.facebook.com/help/?faq=213183835379234; last accessed on May 23, 2012.

http://learn.linkedin.com/inbox; last accessed on May 23, 2012.

Improving Relevance Office 2007; msdn; http://msdn.mircorsoft.com/en-us/library/ms584432(d=printer,v=office.12); last downloaded Jun. 1, 2012.

PinguyOS; http:/forum.pinguyos.com/index.php; last accessed on May 23, 2012.

Plugins http://buddypress.org/extend/plugins/?search=BP+unread+post; last accessed on May 23, 2012.

Quickstart Guide: What Matters-Communications\Jive Community; https://community.jivesofware.com/docs/DOC-43665; Aug. 1, 2011.

SB. Hecht et al.; "SearchBuddies: Bringing Search Engines into the Conversation"; Association for the Advancement of Artificial Intelligence; 2012.

Site Update: Unread Message Counts, Sta.sh Updates by $danlev and deviantArt; http://http://danlev.deviantart.com/journal/Site-Update-Unread-Message-Counts-Sta-sh-Updates-289171986?moodonly=1; last accessed on May 23, 2012.

Socialcast; http://socialcast.com/team-collaboration; last accessed on May 23, 2012.

TDash-Online Twitter Client That Makes Managing Unread Tweets Easy; http://www.makeuseof.com/tag/webbased-twitter-client-tdash-lets-manage-unread-tweets-ease/; last accessed on May 23, 2012.

Twitter Help Center; "About Top Search Results"; https://support.twitter.com/articles/131209-what-are-top-tweets; last downloaded Jun. 1, 2012.

Unread Posts <<bbPress Plugin Browser; http://bbpress.org/plugins/topic/unread-posts/; last accessed on May 23, 2012.

"Data Sheet for Salesforce Chatter", http://www.salesforce.com/events/docs/DS_Chatter_2010-04-02.pdf; last downloaded Sep. 18, 2012.

"Salesforce Chatter" http://www.salesforce.com/crm/sales-force-automation/sales-tracking/; last downloaded Jun. 5, 2012.

"IdeaPlaneKinetic Product"; http://ideaplane.com/products/features; copyright 2010-2012—IdeaPlane, last downloaded Jun. 5, 2012.

"Mark as Read for WordPress"; http://codecanyon.net/item/mark-as-read-for-wordpress/696983; last downloaded Jun. 5, 2012.

"Mapping Search Relevance to Social Networks"; http://www.socialnetworkanalysis.info/snakdd2009/AcceptedPapers/snakdd2009_submission_7.pdf; the 3rd SNA-KDD Workshop '09 (SNA-KDD'09), Jun. 28, 2009; Paris, France; Copyright 2009; ACM978-I-59593-848-0.

"IBM Connections"; http://www-01.ibm.com/software/lotus/products/connections/features.html?S_CMP=rnav; last downloaded Jun. 5, 2012.

Oracle Data Sheet; "Oracle on Track Communication"; 2011.

Oracle, "Oracle on Track Communication White Paper"; Mar. 2011.

Enterprise Social Software/Socialtext Features; "Socialtext 5.0 Features"; http://www.socialtext.com/features/, last downloaded May 30, 2012.

IBM-IBM Connectins_Social software for business—IBM Connections-Software; "IBM Connections Driving business results"; http://www-01.ibm.com/software/lotus/products/connections; last downloaded May 30, 2012.

IBM Connections—Social Analytics; "IBM Connections Social Analytics"; http://www-01.ibm.com/software/lotus;products/connections/analytics.html; last downloaded May 30, 2012.

Yammer: People and Conversations—What is Yammer; "Connect with your Coworkers"; https://www.yammer.com/product/features/people-and-conversations/; last downloaded May 30, 2012.

Microsoft Online Services; "Enhancing Collaboration and Increasing Innovation with Social Computing"; Microsoft Corporation: Feb. 2009.

R. Schirru; "Topic-Based Recommendations in Enterprise Social Media Sharing Platforms"; SecSys2010; Sep. 26-30, 2012; Barcelona, Spain; ACM 978-1-60558-906-0/10/09; pp. 369-372.

* cited by examiner

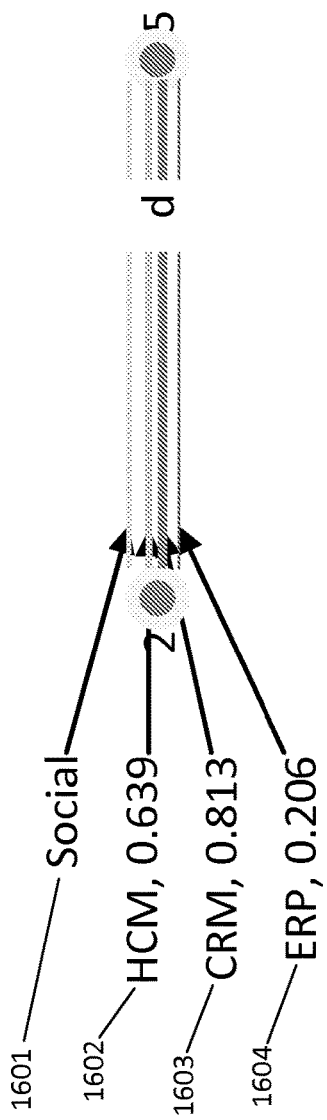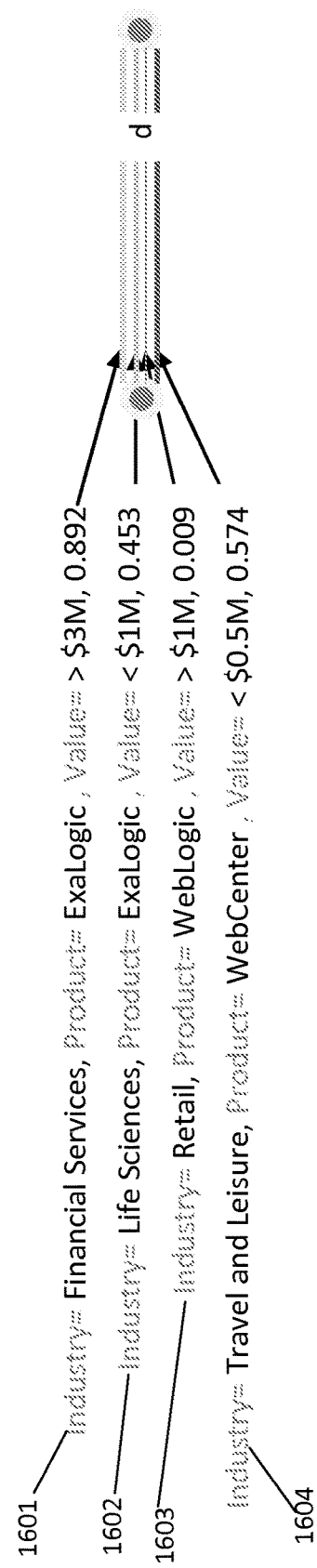
Fig. 16a
Fig. 16b

SOCIAL NETWORK SYSTEM WITH CORRELATION OF BUSINESS RESULTS AND RELATIONSHIPS

FIELD

One embodiment is directed generally to a networked computer system, and in particular to a social network system that tracks relationships and business results.

BACKGROUND INFORMATION

A social network service or system, or "social network", is an online service, platform, or site that focuses on facilitating the building of social networks or social relations among people who, for example, share interests, activities, backgrounds, or real-life connections. A social network service typically includes a representation of each user, typically referred to as a user "profile", his/her social links, and a variety of additional services. Most social network services are web-based and provide means for users to interact over the Internet, such as e-mail and instant messaging. Social networking sites allow users to share ideas, activities, events, and interests within their individual networks.

The use of social network services in an enterprise/business context is increasingly popular. Because social networks connect people at low cost, they can be beneficial for entrepreneurs and small businesses looking to expand their contact bases. These networks often act as a customer relationship management tool for companies selling products and services. Companies can also use social networks for targeted advertising in the form of banners and text ads. Since businesses operate globally, social networks can make it easier to keep in touch with contacts around the world.

SUMMARY

One embodiment is a system that generates a social network and correlates business results within that social network. The system receives, from an enterprise application, a business object, an associated system of record and corresponding enterprise members. The system generates a social object for the social network, where the social object corresponds to the business object. The system assigns social members to the social object and receives any changes to the business object. The system then correlates the change in the business object to each of the enterprise members and social members via the social object.

BRIEF DESCRIPTION OF THE DRAWINGS

FIG. 5 is a screenshot showing another example social object in accordance with one embodiment of the present invention.

FIG. 7 is a screenshot showing the example business object of FIG. 6 after the share button has been selected in accordance with an embodiment of the present invention.

FIG. 8 is a screenshot showing the example business object of FIG. 7 after the New Related Conversation button has been selected in accordance with an embodiment of the present invention.

FIG. 9 is a screenshot showing the example business object of FIG. 6 after the conversations tab is selected in accordance with an embodiment of the present invention.

FIG. 12 is a screenshot showing an example business object for a CRM system-of-record.

FIG. 13 is a screenshot showing a social object that corresponds to the business object of FIG. 12 for the CRM system-of-record.

FIG. 14 is a screenshot showing the social object of FIG. 13.

FIGS. 16a and 16b illustrate a drilling down of a connection "d" of FIG. 15b in accordance with one embodiment of the present invention.

DETAILED DESCRIPTION

One embodiment is a social network system that creates social objects that correspond to business objects from enterprise business applications. The relationships among members of an enterprise business application and among members of the corresponding social object, and the relationships between all members, is stored and analyzed and can be used to create an "enterprise social graph". The social network further can determine and correlate the contribution of all members that are involved in achieving a business goal embodied within a business object with the relationships shown in the enterprise social graph.

Figure 1:
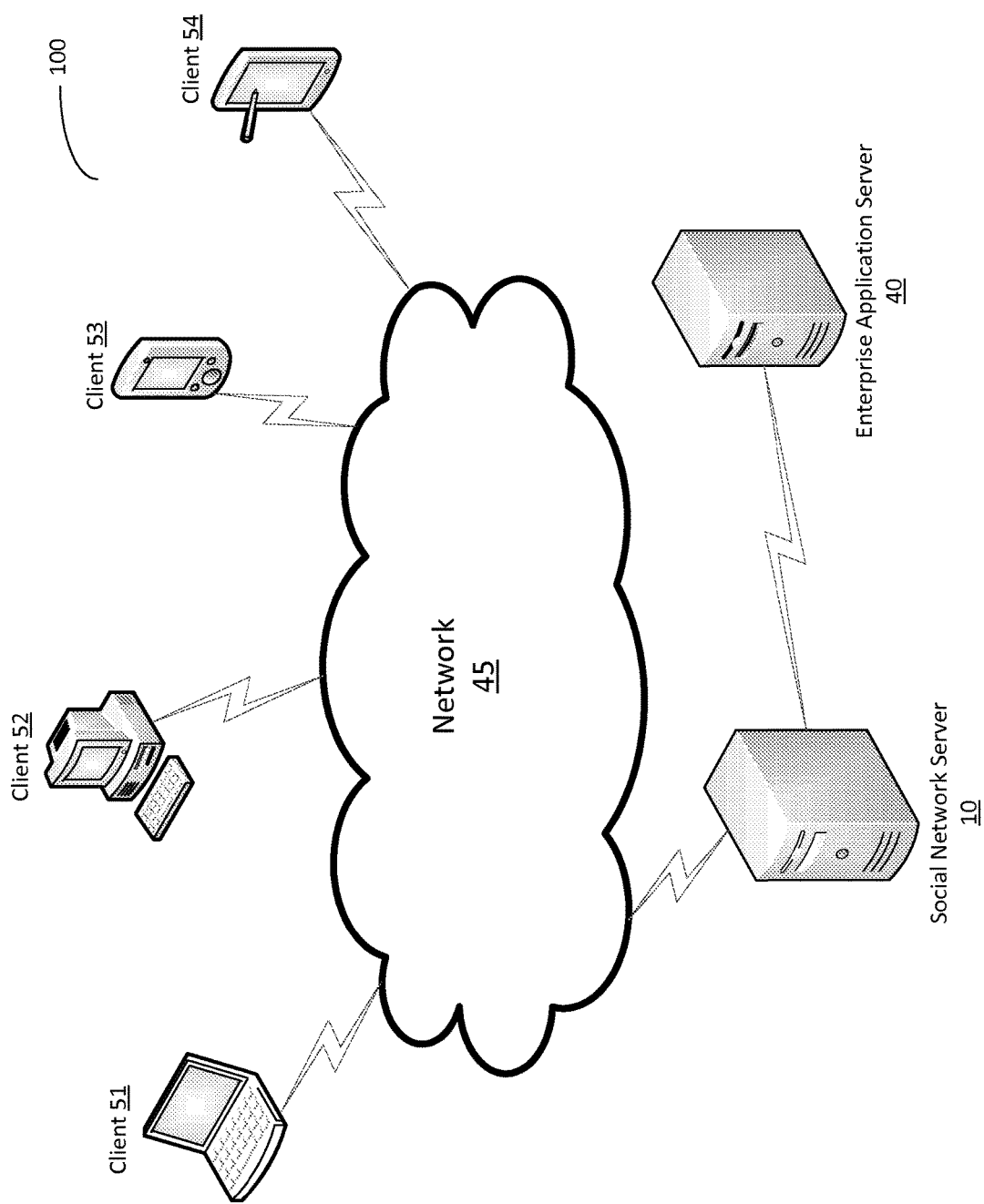
FIG. 1 is an overview block diagram of an example of a social network in accordance with embodiments of the present invention.

FIG. 1 is an overview block diagram of an example of a social network 100 in accordance with embodiments of the present invention. Social network 100 includes a social network server/system 10 coupled to client devices 51-54 through a network 45. Network 45 can be any type of communication network, such as the Internet or an Intranet or other private network. Client devices 51-54 can be any type of device that allows a user to interface with server 10, including a laptop computer 51, a desktop computer 52, a smart phone 53, a tablet 54, etc., using a wired or wireless connection, or any other method. Further, in other embodiments, a user can interface directly with server 10 (i.e., not via a network) through a directly coupled client device (not shown). Client devices 51-54 execute a web browser or other functionality that provides an interface with server 10.

Social network server/system 10, in conjunction with the other devices of FIG. 1, substantially provides the functionality of a social network, as disclosed in more detail below. Social network server 10 is coupled to an enterprise application server 40. Enterprise application server 40 in one embodiment is a server or servers that execute enterprise applications, such as human resource ("HR") applications, customer relationship management ("CRM") applications, enterprise resource planning ("ERP") applications, etc. In one embodiment, the enterprise applications on server 40 are the "E-Business Suite" or "Fusion" applications from Oracle Corp. Server 10 can be directly coupled to server 40, or can be coupled in any other way such as over a network. In addition, the functionality of server 40 can be included on server 10. Further, server 40 can be coupled to clients 51-54 directly through a network or other means rather than through server 10. Server 40 is generally not part of social network 100, but provides the business objects and system-of-records that are used to generate social objects.

Figure 2:
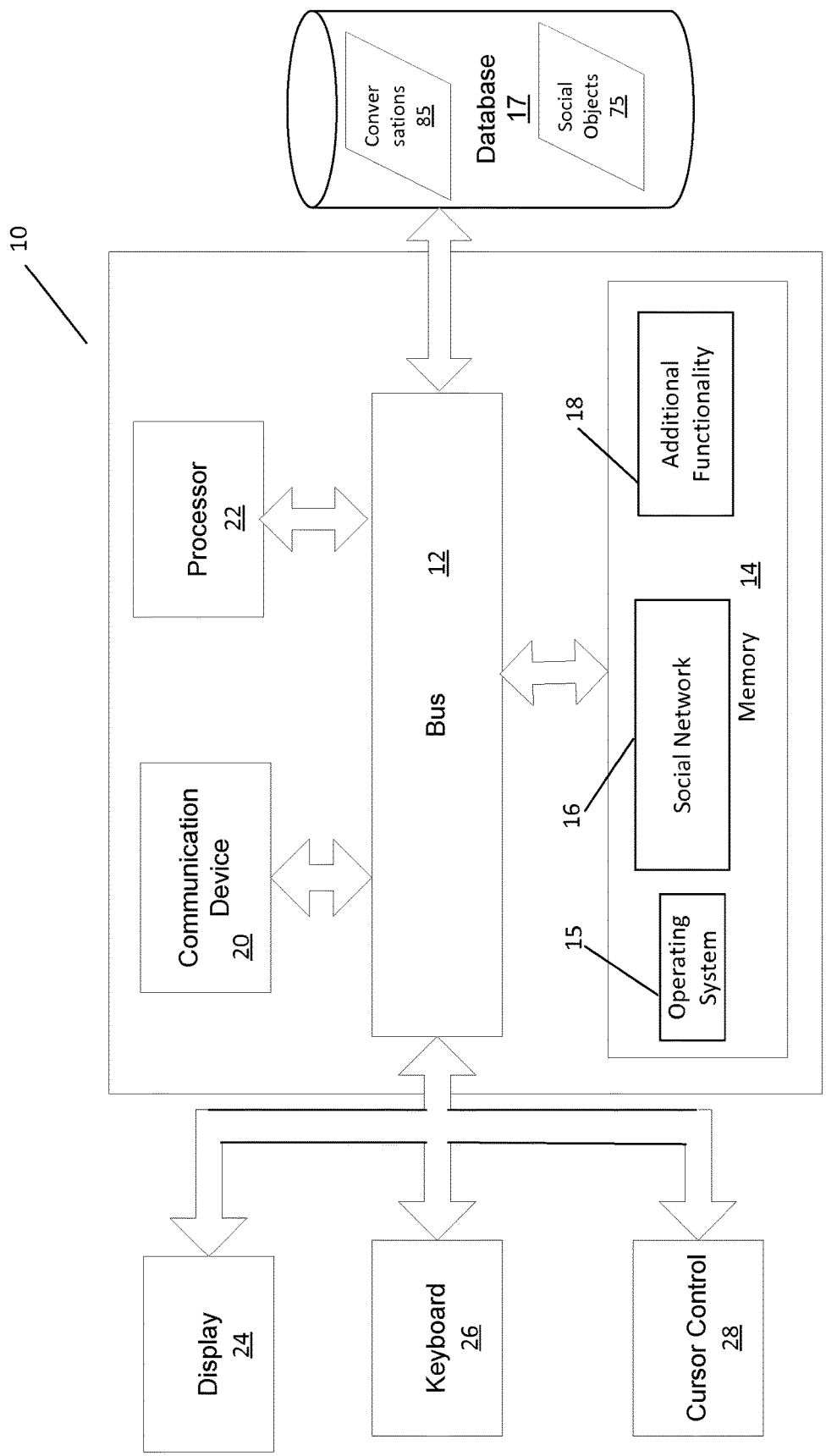
FIG. 2 is a block diagram of the social network server/system of FIG. 1 in accordance with an embodiment of the present invention.

FIG. 2 is a block diagram of social network server/system 10 of FIG. 1 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a social network module 16 for providing social network functionality and an enterprise social graph, as disclosed in more detail below. System 10 can be part of a larger system, such as an ERP system, if that functionality is not already provided by server 40 of FIG. 1. Therefore, system 10 can include one or more additional functional modules 18 to include the additional functionality. A database 17 is coupled to bus 12 to provide centralized storage for modules 16 and 18 and store data such as user profiles, social objects 75, conversations 85, etc. Storage of these items can also be done remote from system 10.

In one embodiment, social network 100 of FIG. 1 is a secure enterprise collaboration and social network software application and platform designed to facilitate social interactions within the enterprise environment (as opposed to a consumer environment) connecting people, applications and business processes within and across businesses. Social network 100 includes user profiles, conversations 85 and social objects 75.

A "conversation" in social network 100 in one embodiment is a persistent, shared stream of posts and comments (i.e., messages) including, for example, text, rich-text, documents, audio, video, programmatic content (referred to as "gadgets"), etc. A conversation has a defined membership ranging from "Private" (i.e., membership of one/self), through N-members consisting of individuals and or groups of individuals or sub-groups, to "Public" with visibility open across all members of social network 100. Posts within a conversation are viewed with new posts beneath old posts (i.e., multiple posts can be read as text on a page in a book), or vice versa, or in any type of hierarchical format.

One embodiment generates social objects. All data from enterprise applications and business processes can potentially be socialized as a "social object." Social objects contain records from a business application or process (referred to as a "system of record") that are mapped as a visual and programmatic integration into social network 100 via social network server 10. For example, a sales opportunity from within a CRM enterprise application (e.g., the name of a sales prospect and related data for the sales prospect, such as the estimated probability that a sale will close, the expected revenue of the sale, etc.) is integrated into social network 100 as a social object. As a result, social objects are explicitly coupled with conversations, where the social object can be discussed in context, and a record of that discussion can be retained for future viewing.

In one embodiment, a social object in social network 100 includes the following:

A set of programmatic rules defining the behavior of the integration and actions on receiving business events from the object within the system-of-record (i.e., the business object in the enterprise application).

A "wall" (i.e., a stream of posts) displaying publication of changes in the data set of the associated object from within the system-of-record and status posts from members/users of social network 100 with appropriate access rights. The wall provides an activity stream holding short, sometimes unrelated posts in which old information may scroll off the bottom of the list. The wall differs from a conversation in which all content is related.

A set of related conversations or other social objects (e.g., a "Customer" social object can be related to multiple "Opportunity" social objects).

A membership potentially defined, controlled and managed by the system-of-record or open to sharing across the network with individuals and groups.

A "gadget" storing data from the associated object within a system-of-record allowing quick access and updates to the original data set within the system-of-record (e.g., the revenue value of a CRM opportunity is displayed within a gadget and a member with access to the corresponding opportunity social object and the appropriate access rights within the system of record can update the revenue value in the system-of-record from the gadget tied to the social object within social network 100).

A social object may be generated for social network 100 for any business object of an application that users may desire to collaborate on over social network 100. Examples of social objects include (1) an "Opportunity" social object from a CRM application; (2) a "Customer" social object from a CRM application; (3) a "Service Request" social object from a CRM application; (4) a "Business Process Shipment Escalation" social object from a business process application; (5) a "Portal" subject social object from a web portal application; (6) a "General Ledger Period Close" social object from a financial/ERP application; (7) an "Inventory Item" social object from an inventory/ERP application; and (8) an "Ordered Product" social object from a distributed order orchestration application (e.g., "Fusion Distributed Order Orchestration (DOO)" application from Oracle Corp.).

In one embodiment, a conversation for social network 100 can be created for any collaborative purpose, including having a specific discussion, making a decision or resolving a problem. A conversation can be related to a social object. The conversation can have membership which is identical, a superset or a subset of the social object membership. For example, a conversation can be created that is related to a sales opportunity social object in which the sales team works on preparing the presentation for the customer. A second related conversation can be created in which only the sales lead works with the legal team in reviewing contractual changes requested by the customer. Through related conversations, multiple, parallel threads of work between different constituent parties all related to the changing of state of an object within the system-of-record (e.g., the opportunity changes from a state of "Negotiation" to a state of "Won") is achieved while maintaining the relationship, understanding and contextual persistent of the collaboration that drove the changes. For example, related conversations for an Opportunity social object may include a conversation for preparing a presentation, with the suggested presentation content and best practice notes for delivery, and a conversation for finalizing the contract with the appropriate draft contract for the deal size, industry, product and sales region with the associated legal team member added. A social object can also be related to another social object.

Figure 3:
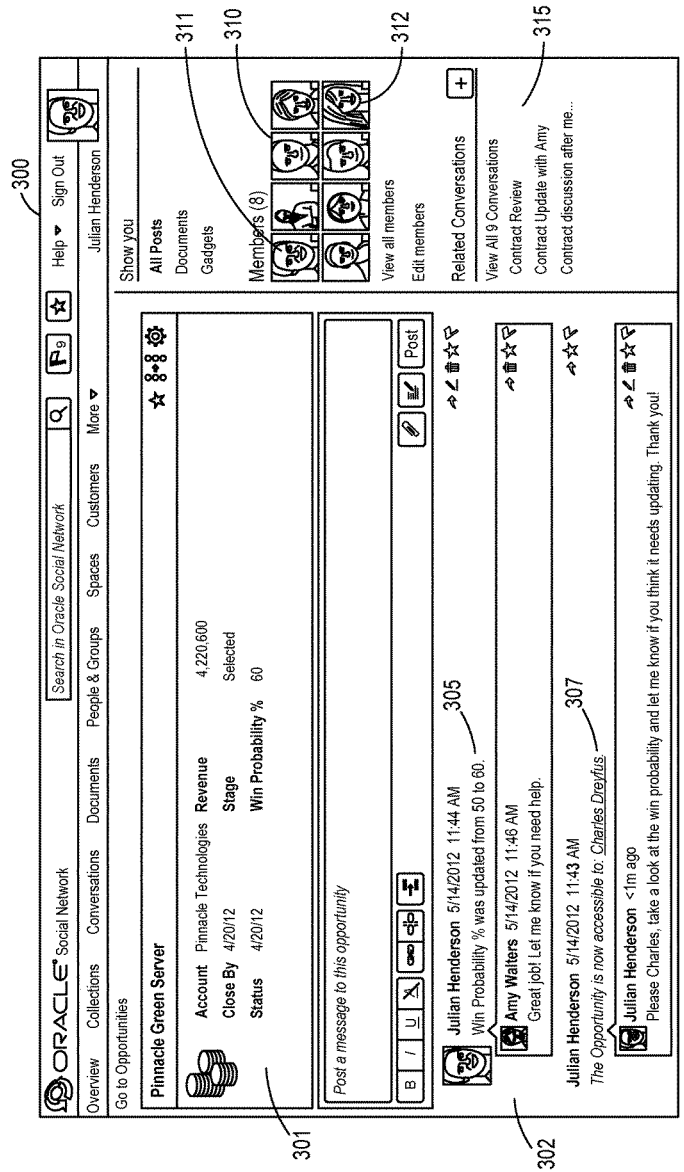
FIG. 3 is a screenshot showing an example social object in accordance with one embodiment of the present invention.

FIG. 3 is a screenshot showing an example social object 300 in accordance with one embodiment of the present invention. Social object 300 shown in FIG. 3 is an Opportunity social object for a "Pinnacle Green Server" product. As shown at 301, information or properties for social object 300 includes the account name ("Pinnacle Technologies"), the expected date of close of the opportunity (Apr. 20, 2012), the expected revenue from the opportunity ($4,220,600), and the probability of success or "win" (60%). The information at 301 is comprised of the properties from the system-of-record of a CRM system that may be external to social network system 100, such as from server 40 of FIG. 1. The properties of 301 are automatically updated as they are updated/changed in the CRM enterprise system. Further, in one embodiment, the properties can be edited in social object 300, and the edits/changes automatically update the properties in the system-of-record of the enterprise system. Therefore, the updating of data/properties can flow in both directions: from the enterprise application to the social network, and vice versa.

Social object 300 further includes a wall 302 that shows a history of all of the changes that have occurred on the social object. For example, at 305, the win probability is shown to have been updated by "Julian Henderson" from 50% to 60% on May 14, 2012 at 11:44 a.m. At 307, a new member, "Charles Dreyfus" was given access to the social object on May 14, 2012 at 11:43 a.m.

Social object 300 further includes a list of all members of the social object at 310. The members who are currently online for that social object (e.g., member 311) are shown with a typical thumbnail picture, but members who are currently offline (e.g., member 312) are shown as a grayed out thumbnail picture.

Social object 300 further includes a list of all conversations related to social object 300 at 315. A user can view one of the conversations by selecting the conversation. In one embodiment, social object 300 and new related conversations such as related conversations 315 are created when the user is interacting with the external or third party enterprise system such as a CRM or ERP system executing on, for example, server 40 of FIG. 1. For a given business object within a system-of-record of an enterprise application, a social object and a customized set of related conversations with content can be created programmatically (e.g., as a pre-defined template) to assist with the collaboration required to change the state of the system-of-record. In one embodiment, an application programming interface ("API") from the enterprise application to the social network application allows changes in the system-of-record to be communicated to the social network system, and vice versa. A selectable list of other social objects that are related to social object 300 can also be displayed.

Figure 4:
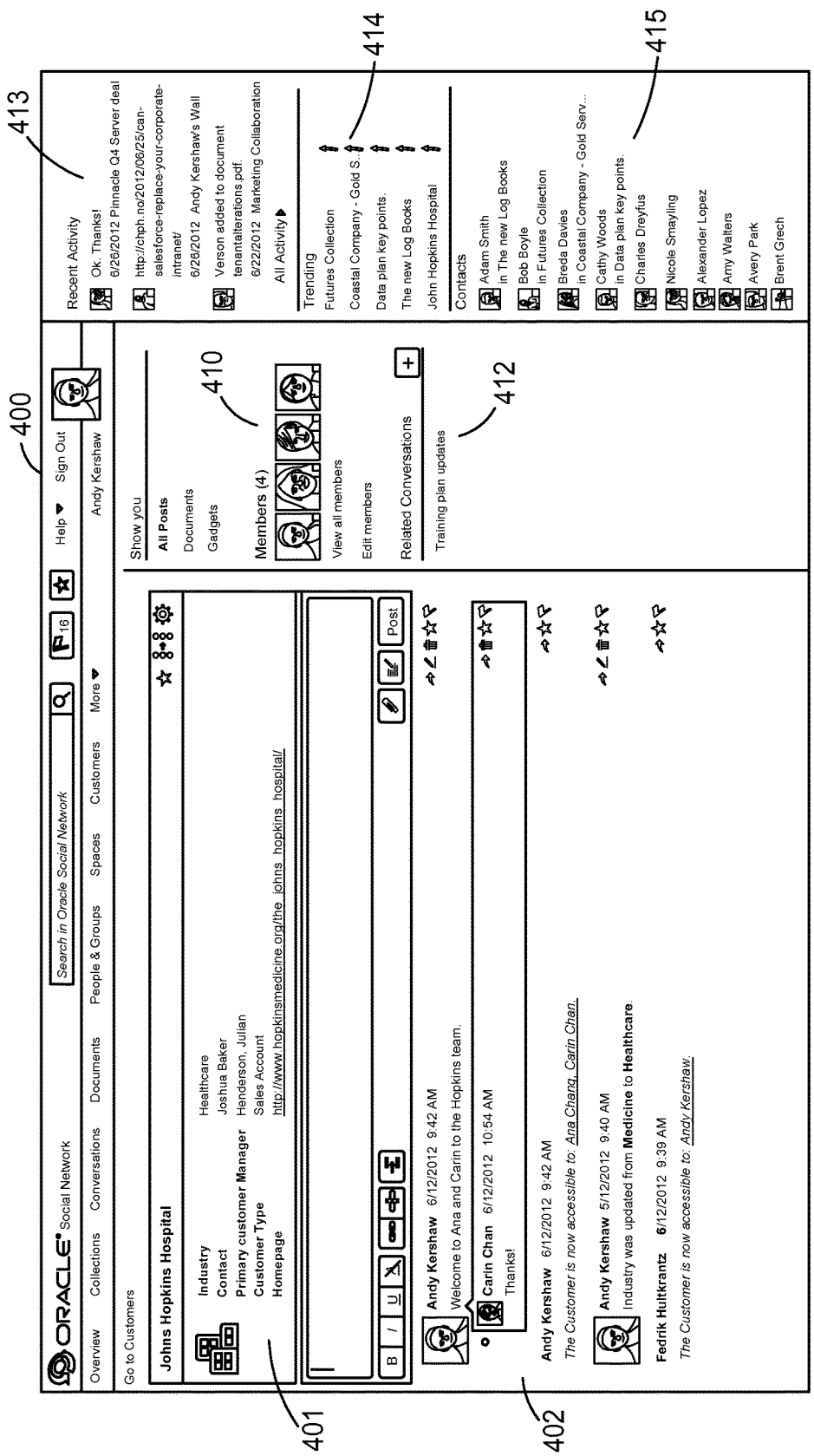
FIG. 4 is a screenshot showing another example social object in accordance with one embodiment of the present invention.

FIG. 4 is a screenshot showing another example social object 400 in accordance with one embodiment of the present invention. Social object 400 shown in FIG. 4 is a Customer social object for a customer named "Johns Hopkins Hospital". The customer in one embodiment is generated from a business object and updated from a system-of-record of a CRM system. The information properties for social object 400 are shown at 401, and the wall is shown at 402. Social object 400 further includes a display of members at 410 and a list of related conversations at 412. Social object 400 further includes a listing of recent activity at 413, trending activity at 414, and selectable contact information for each member at 415 (which may be the members of social object 400, or a list of contacts specific to each user).

Figure 5:
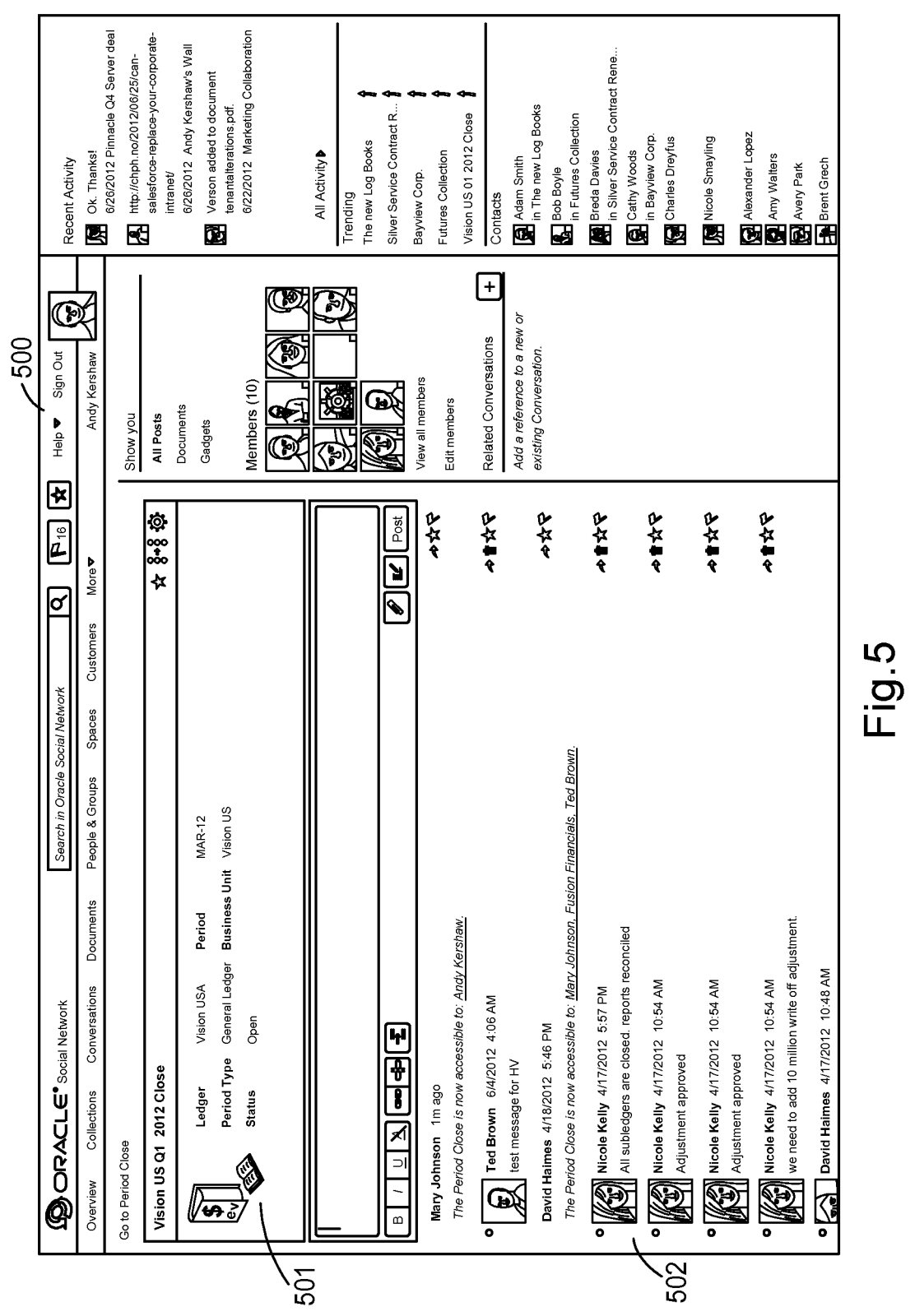

FIG. 5 is a screenshot showing another example social object 500 in accordance with one embodiment of the present invention. Social object 500 shown in FIG. 5 is a General Ledger Period Close social object for the "Vision US Q1 2012" period close. The period closing financial information in one embodiment is generated from a business object and updated from a system-of-record of a financial/ERP system. The information properties for social object 500 are shown at 501, and the wall is shown at 502. Social object 500 further includes the same elements as social object 400 of FIG. 4

Figure 6:
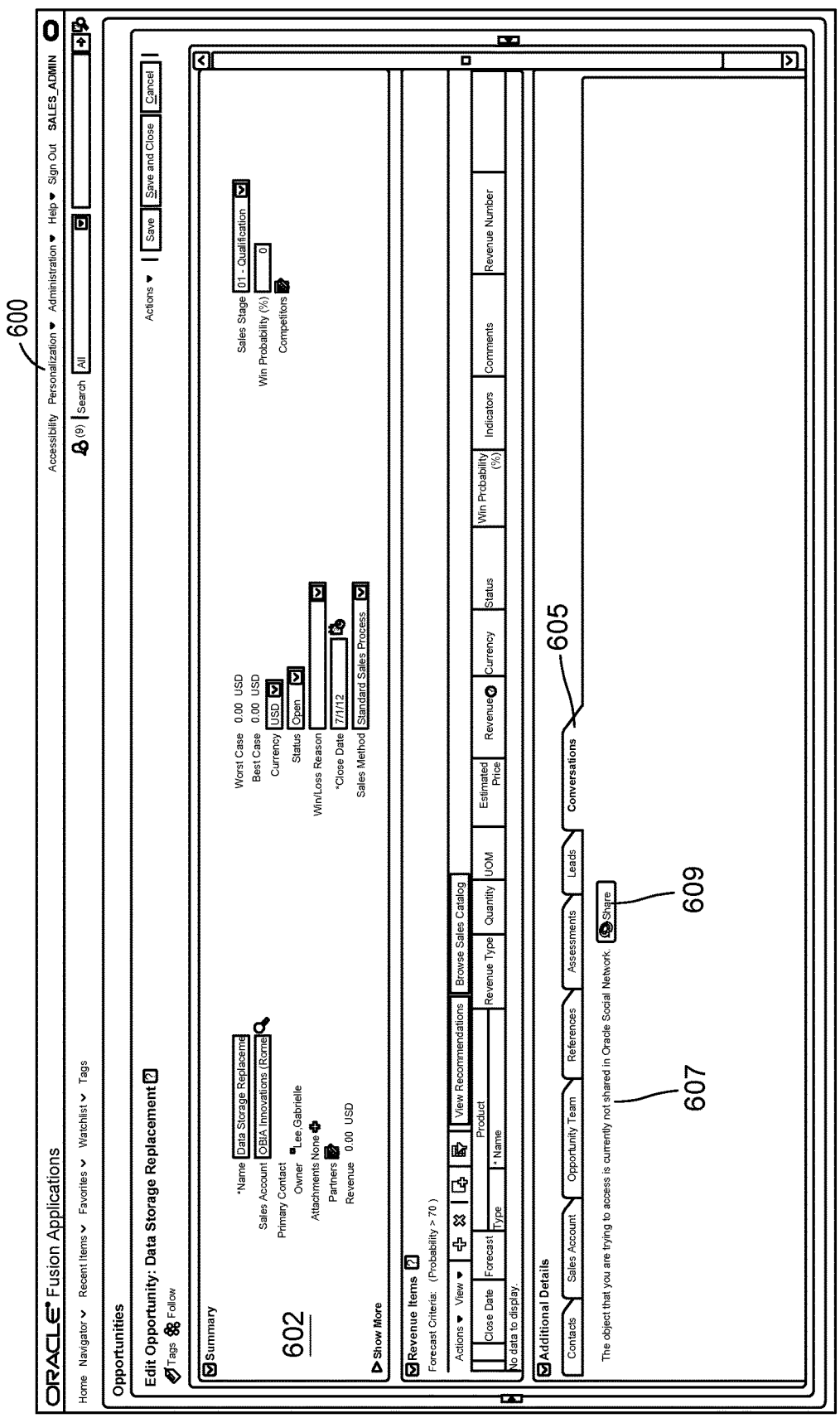
FIG. 6 is a screenshot showing an example business object within an enterprise application in accordance with an embodiment of the present invention.

FIG. 6 is a screenshot showing an example business object 600 within an enterprise application in accordance with an embodiment of the present invention. Business object 600 is an "Opportunity" object named "Data Storage Replacement" within a CRM system. The summary section 602 provides the system-of-record properties for the object. Business object 600 provides links to a corresponding social object in social network 100. Specifically, a tab 605 can be selected to create a conversation related to the corresponding social object. When tab 605 is selected, an API to social network server 10 and social network 100 is used to provide the integration.

In the example of FIG. 6, tab 605 is selected to generate a conversation. However, because the object is not yet shared, a message 607 indicates that the object is not yet shared, and a "Share" button 609 is provided to share the object. Sharing the object causes a social object to be generated that corresponds to business object 600. An API to social network server 10 and social network 100 is used to generate the social object.

Figure 7:
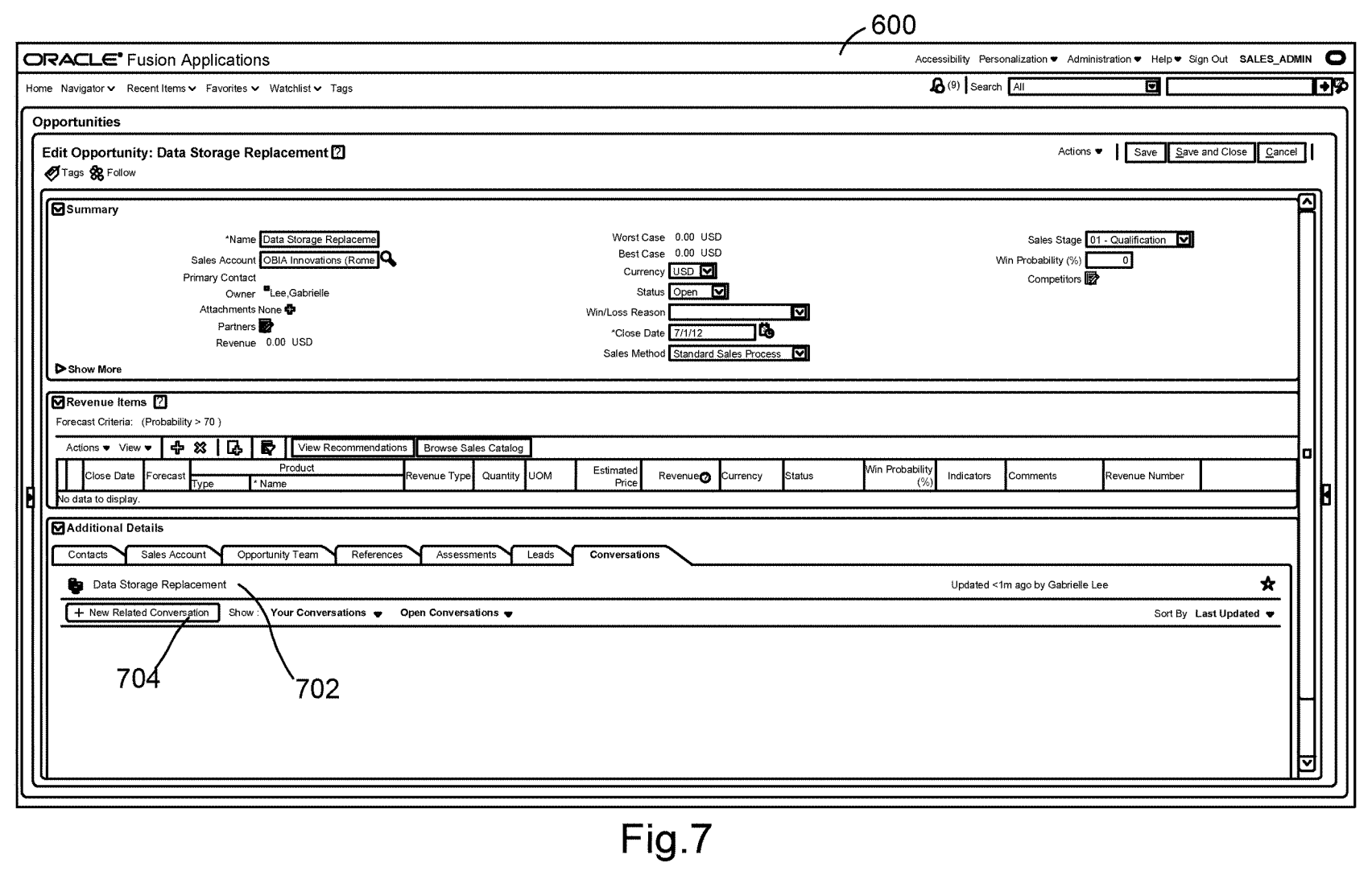

FIG. 7 is a screenshot showing the example business object 600 of FIG. 6 after Share button 609 has been selected in accordance with an embodiment of the present invention. As shown at 702, a "Data Storage Replacement" social object has been created in social network 100. Business object 600 further includes a "New Related Conversation" button 704 that can be selected to create a new conversation related to the corresponding "Data Storage Replacement" social object.

Figure 8:
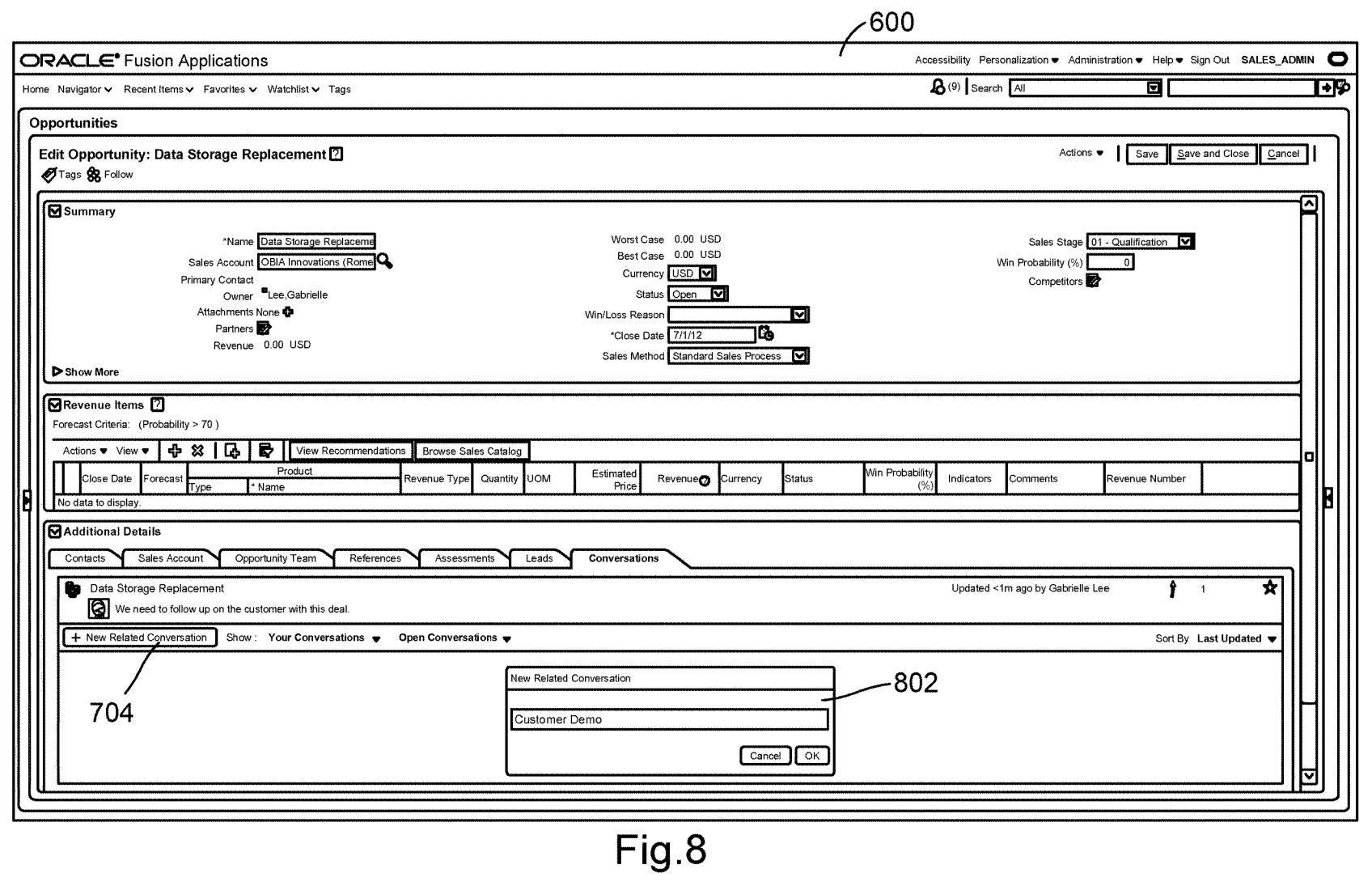

FIG. 8 is a screenshot showing the example business object 600 of FIG. 7 after New Related Conversation button 704 has been selected in accordance with an embodiment of the present invention. A window 802 pops up and the user can enter the name of the new conversation (e.g., "Customer Demo").

Figure 9:
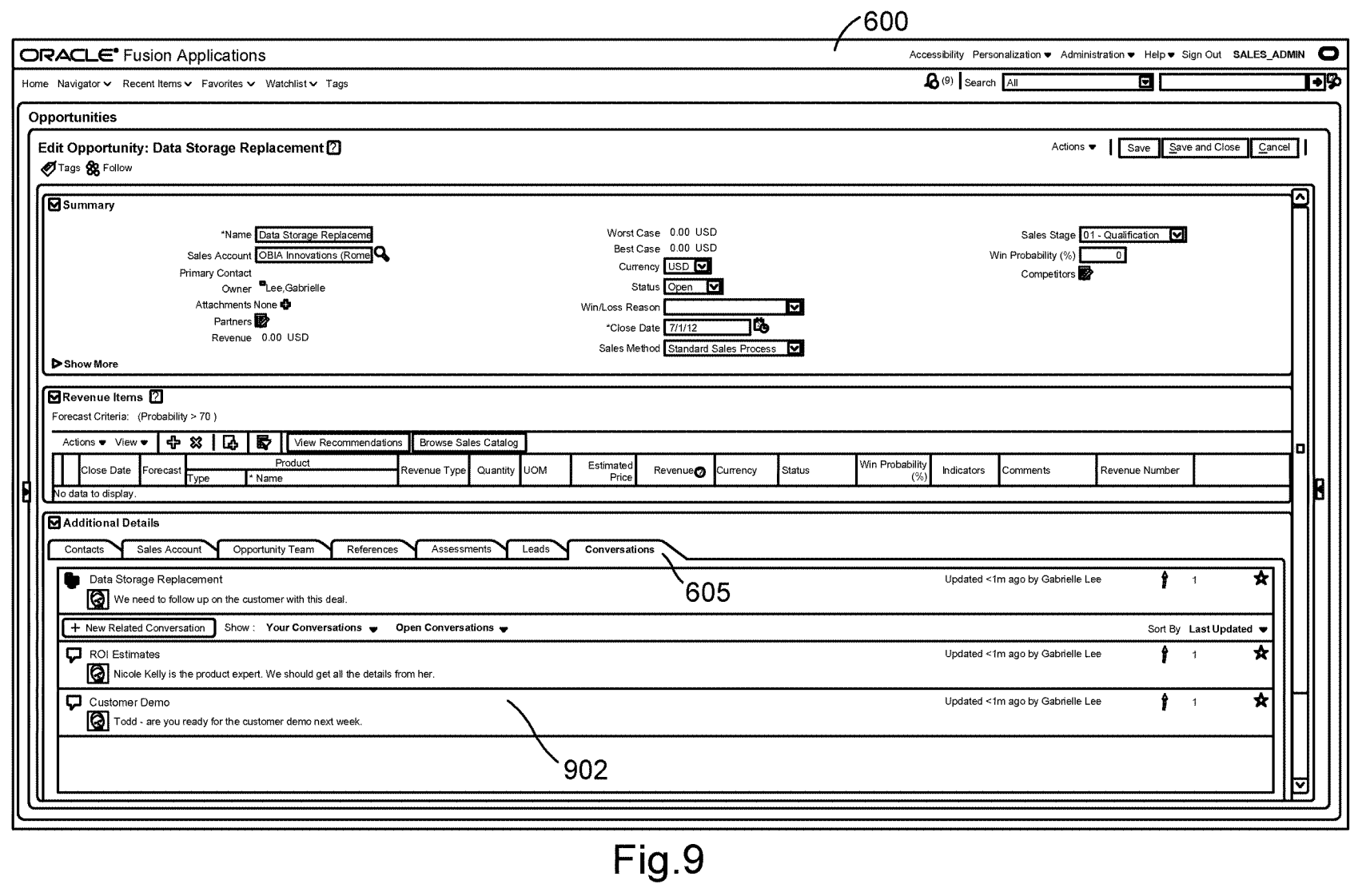

FIG. 9 is a screenshot showing the example business object 600 of FIG. 6 after conversations tab 605 is selected in accordance with an embodiment of the present invention. When tab 605 is selected, now that a social object has been created, all related conversations are displayed at 902. As shown, for the Data Storage Replacement social object, there are two related conversation: "ROI Estimates" and "Customer Demo." In FIG. 9, the related conversations are viewed in-context within the associated system-of-record. However they also may be viewed from within social network 100, as shown in FIG. 3, where the related conversations will be listed for user selection at 315 of FIG. 3.

Figure 10:
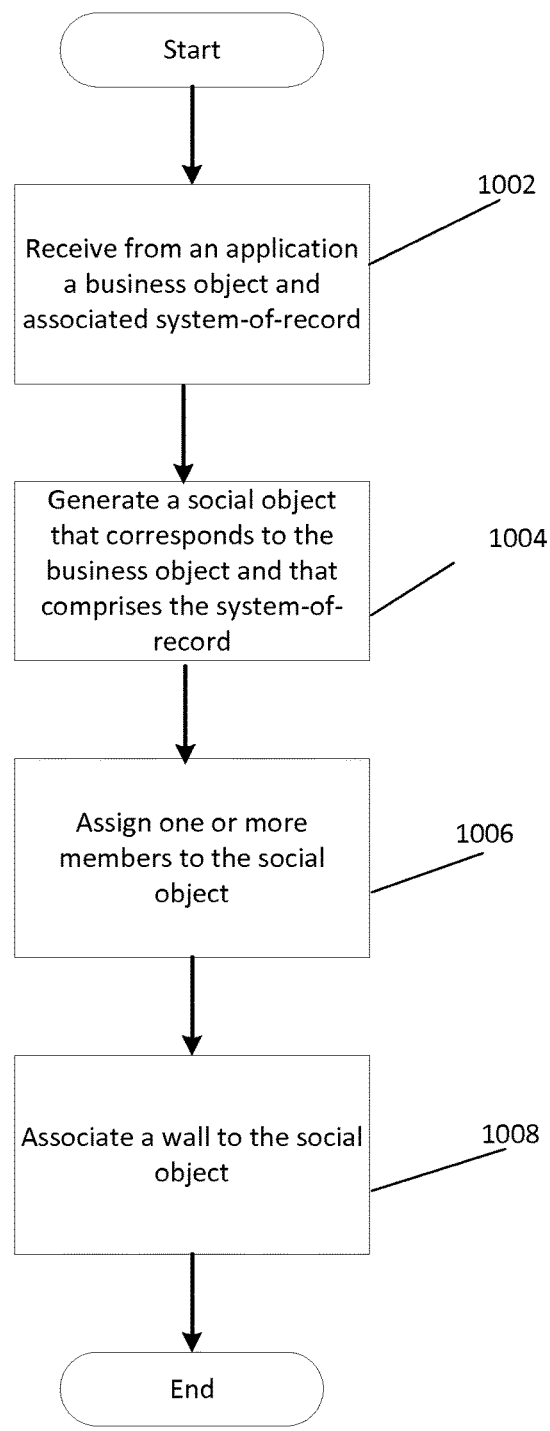
FIG. 10 is a flow diagram of the functionality of the social network module of FIG. 2 when generating a social object from a business object in accordance with one embodiment.

FIG. 10 is a flow diagram of the functionality of social network module 16 of FIG. 2 when generating a social object from a business object and system-of-record in accordance with one embodiment. In one embodiment, the functionality of the flow diagram of FIG. 10, and FIGS. 11 and 17 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1002, social network module 16 receives from an application a business object and associated system-of-record. In one embodiment, the application is an enterprise application such as a CRM or ERP application. An example of a system-of-record for a business object is shown in section 602 of FIG. 6. An API to social network server 10 and social network 100 of FIG. 1 is used to receive the business object.

At 1004, social network module 16 generates a social object that corresponds to the business object and that comprises the system-of-record. An example of a social object is social object 300 of FIG. 3, in which the system-of-record is shown in section 301.

At 1006, social network module 16 assigns one or more members to the social object. An example of assigned members are members 310 of social object 300 of FIG. 3.

At 1008, social network module 16 associates a wall to the social object. The wall displays changes to the system-of-record. An example of a wall is wall 302 of social object 300 of FIG. 3.

Figure 11:
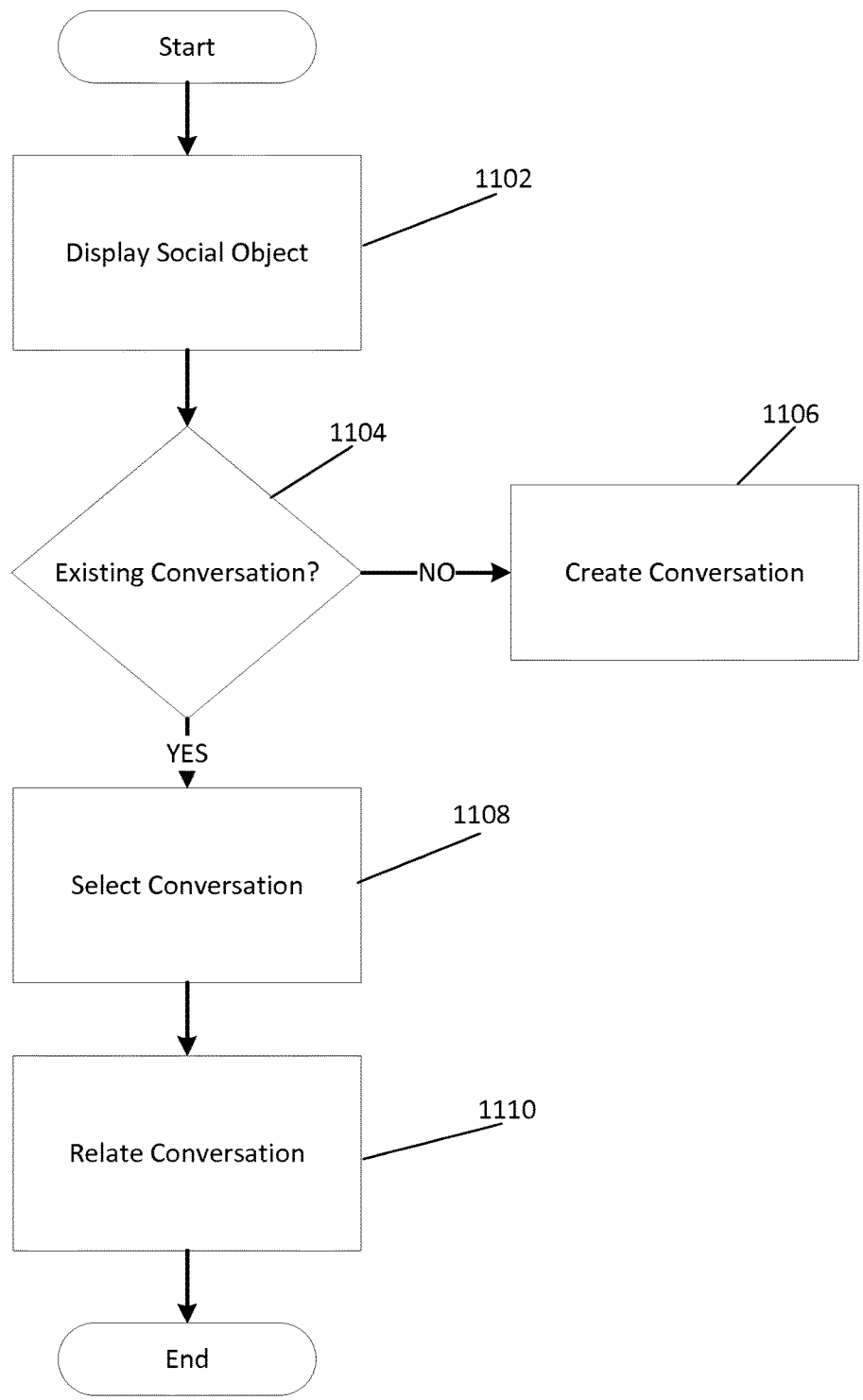
FIG. 11 is a flow diagram of the functionality of the social network module of FIG. 2 when relating a conversation to a social object in accordance with one embodiment.

FIG. 11 is a flow diagram of the functionality of social network module 16 of FIG. 2 when relating a conversation to a social object in accordance with one embodiment.

At 1102, the social object is displayed (assuming it has been created) with the system-of-record. For example, as shown in FIG. 7, social object 702 is displayed within the system-of-record for data storage replacement opportunity.

At 1104, it is determined if there are any existing conversations for the social object. If no at 1104, a conversation is created at 1106. The new conversation at 1106 is automatically related to the social object.

If conversations exist 1104, the conversation is selected at 1108, and the conversation is then related to the social object at 1110.

The functionality of FIG. 11 can be performed within an enterprise application, as shown in FIGS. 6-9, or within social network 100. An API to social network server 10 and social network 100 is used to provide the integration of FIG. 11.

As disclosed, social network 100 allows a social object to be generated and one or more conversations can be related to the social object. The social object is a set of properties tied to a wall. These properties are directly connected to the object in the system-of-record, and are updated either when they are changed in the system-of-record directly, or through actions in social network 100. Changes made within social network 100 are pushed back to the system-of-record to keep the object's properties current at all times. All changes can be logged on the wall, and related conversations can easily be created to discuss specific issues concerning the social object. The social object can be exposed through any type of applications, including the web client, "Outlook" from Microsoft Corp., or other email applications, stand-alone embeddable clients, and all mobile clients.

Social network 100 includes a set of predefined integration mechanisms that enable the user to define how and what data is retrieved from the system-of-record, how to display that data in social network 100 (for example, through social objects) and who within social network 100 has access to the data.

These predefined mechanisms are built to handle the most common application chores, such as specifying membership lists in social network 100 and property sensitivity (i.e., not everyone should be able to see or update all properties without authorization), and updating properties in both directions. For example, when a social object property is updated in the system-of-record, that change is published in social network 100 based on the user permission rules that the user has defined.

Social objects are defined in social network 100 as records within a system-of-record, such as customer or service records from a CRM system. Social object records include metadata and a wall, which includes membership lists and related conversations. Social objects expose system-of-record information to users who interact with and collaborate around the data through a user interface of social network 100.

The social objects provide a uniform and collaborative view of information from all integrated system-of-record. The social objects provide a wide range of services and capabilities in one embodiment, including:

Displaying select metadata needed for collaboration via an extensible gadget, usually visible as part of a wall;
Receiving a data stream of important activities fed by an activity stream or a web service from a system-of-record;
Enabling users to post messages, create follow ups, and easily catch up with activity through persisted and related conversations;
Enabling controlled access and collaboration with others via membership lists and rules;
Linking to other social objects; and
Starting related conversations to the social object.

As an example of the functionality of a social object, after a CRM Opportunity social object retrieves a stream of data input from the social object's wall, the process may unfold as follows:

1. Changes in the Opportunity's status, forecast, and revenue are published to the Opportunity's Wall.
2. The new information is shared with a broader group of individuals, who provide more context to the Opportunity.
3. Users not directly tied to the CRM Opportunity team can now interact and react to the Opportunity's status. For example, if the Opportunity is won, that may be the Service organization's cue to take over and begin the implementation process. The Service organization can then publish that information on the Opportunity's Wall.

Communication also works in the other direction. When the Opportunity is updated from within social network 100, the change is reflected in the system-of-record as well. Before the change is made, social network 100 checks to ensure that the user has the right to update the object, from changing a simple property to changing the state of the object (for example from "Pending" to "Won"). There is no need to go back into CRM to update key fields as social network 100 automatically provides the updates.

Figure 12:
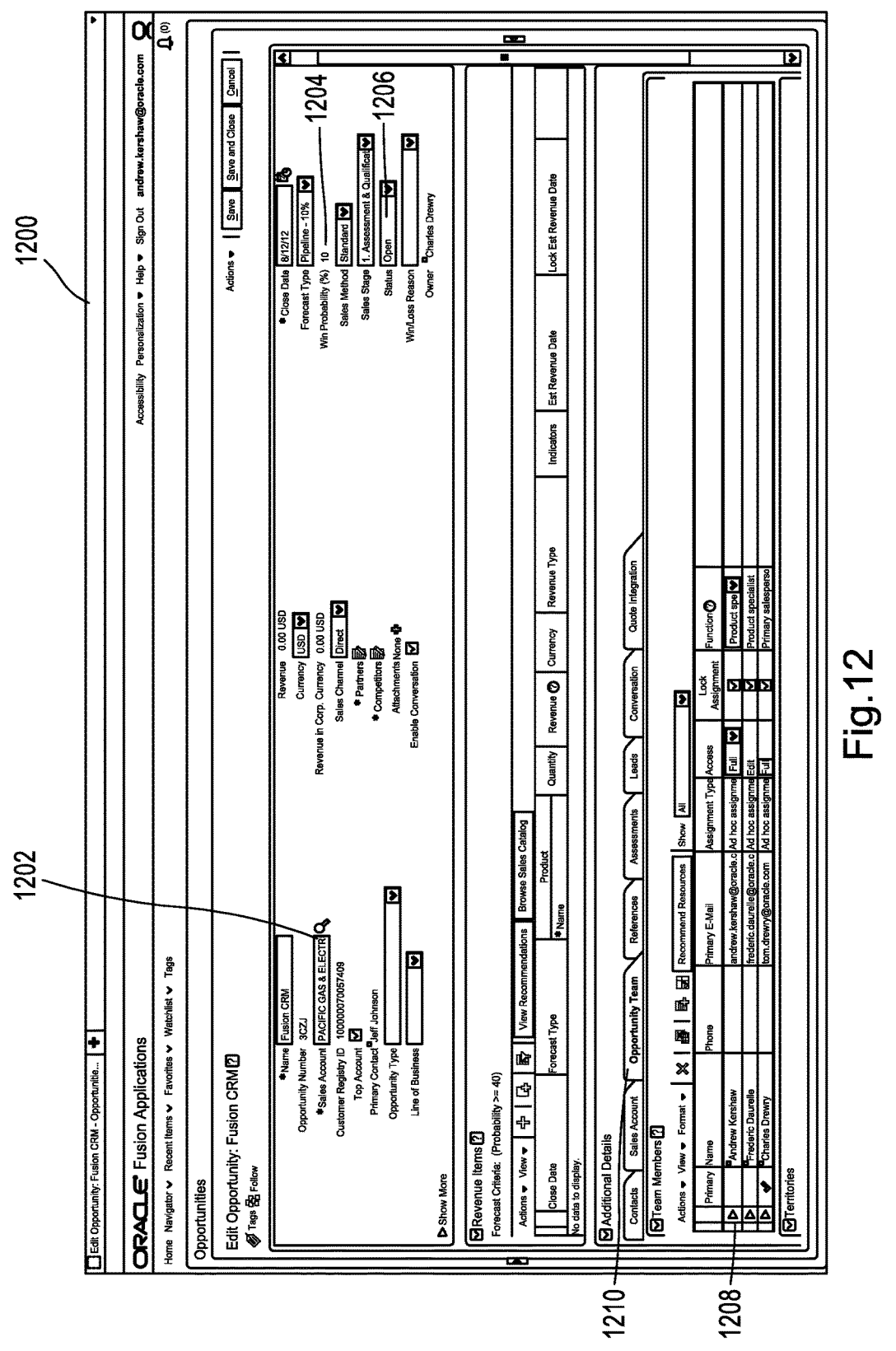

A typical business object within an enterprise application, such as business object 600 of FIG. 6, includes a set of members or a defined "team" that is put together to achieve a business goal. As an example, FIG. 12 is a screenshot showing an example business object 1200 for a CRM system-of-record. Business object 1200 is an "Opportunity" business object and includes information such as the name of the account 1202, a "win probability" 1204, and a "status" 1206, which in FIG. 12 is listed as "Open" but can be revised within business object 1200 (or from within a corresponding social object as discussed above) to "Won", "Lost", etc. The team members are listed at 1208 by selecting the "Opportunity Team" tab 1210. As shown in FIG. 12, business object 1200 includes three team members: "Andrew Kershaw", "Fredric Daurelle" and "Charles Drewry."

An "enterprise graph" can be generated to track relationships between individuals and business objects. The graph can be used to generate metrics that are useful in evaluating an individual's performance, determining an individual's expertise and knowledge, etc. For example, for business object 1200, the enterprise graph will link all team members to the opportunity defined by the business object. If business object 1200 is ultimately "won" in terms of a successful sale (i.e., the business goal of the business object is achieved), an enterprise graph can correlate or attribute that sale to each of the team members. Through analysis of the relationships created and assigned by enterprise applications and processes, the enterprise graph is generated. For example, the human resources hierarchy, lines-of-business and management teams are a set of relationships on which strength can be attributed. In addition, the enterprise application defined teams, such as the sales team and project team are recorded as shown in FIG. 12 for access to specific objects within a system-of-record, which creates another set of relationships.

Further, through analysis of the collaborative interactions between individuals within social network 100 (or any collaboration data set such as an email corpus) a social graph is calculable depicting the relationships/connections and the strength of the tie between individuals. The social graph can be used to highlight individuals of value within an organization who for example are key conduits between separate lines of business (referred to as "Organizational Network Analysis"). A social graph within social network 100 is generated through the collaborative interactions within the conversations or social objects and by following individuals within the network.

The enterprise or social graphs can be considered a "collaboration graph" which is a graph modeling a social network where the vertices represent participants of that network (usually individual people) and where two distinct participants are joined by an edge whenever there is a collaborative relationship between them of a particular kind. Collaboration graphs are used to measure the closeness of collaborative relationships between the participants of the network.

Although enterprise graphs and social graphs are generally known, enterprise graphs and social graphs, and/or the data underlying the enterprise graphs and social graphs, are typically not linked, and as a result relevant information is not easily available, including linking changes in a business object to all relevant individuals, including individuals linked in the enterprise graph and individuals linked in the corresponding social graph. For example, an enterprise sales team that "won" an opportunity might have used the assistance of someone outside of the enterprise team, such as a legal specialist, and contacted this individual via email. However, neither the enterprise graph or social graph will link or correlate this individual to the sales win or to any business-driven metric.

Therefore, one embodiment of social network 100 combines an enterprise graph and a social graph into an "enterprise social graph" that can support the finding of expertise, skills or an individual from a specific line-of-business and added to a specific conversation or social object within social network 100. Further, the enterprise social graph can be used within the enterprise applications—answering questions like "which are the most shared presentations?" The enterprise social graph provides a single view of all connections for a business object, including direct business object connections and connections via the corresponding social object, in the form of a collaboration graph. Further, embodiments may not generate an actual visual enterprise social graph—instead, the relationships/correlations can be tracked internally by social network 100 using generated data.

Figure 13:
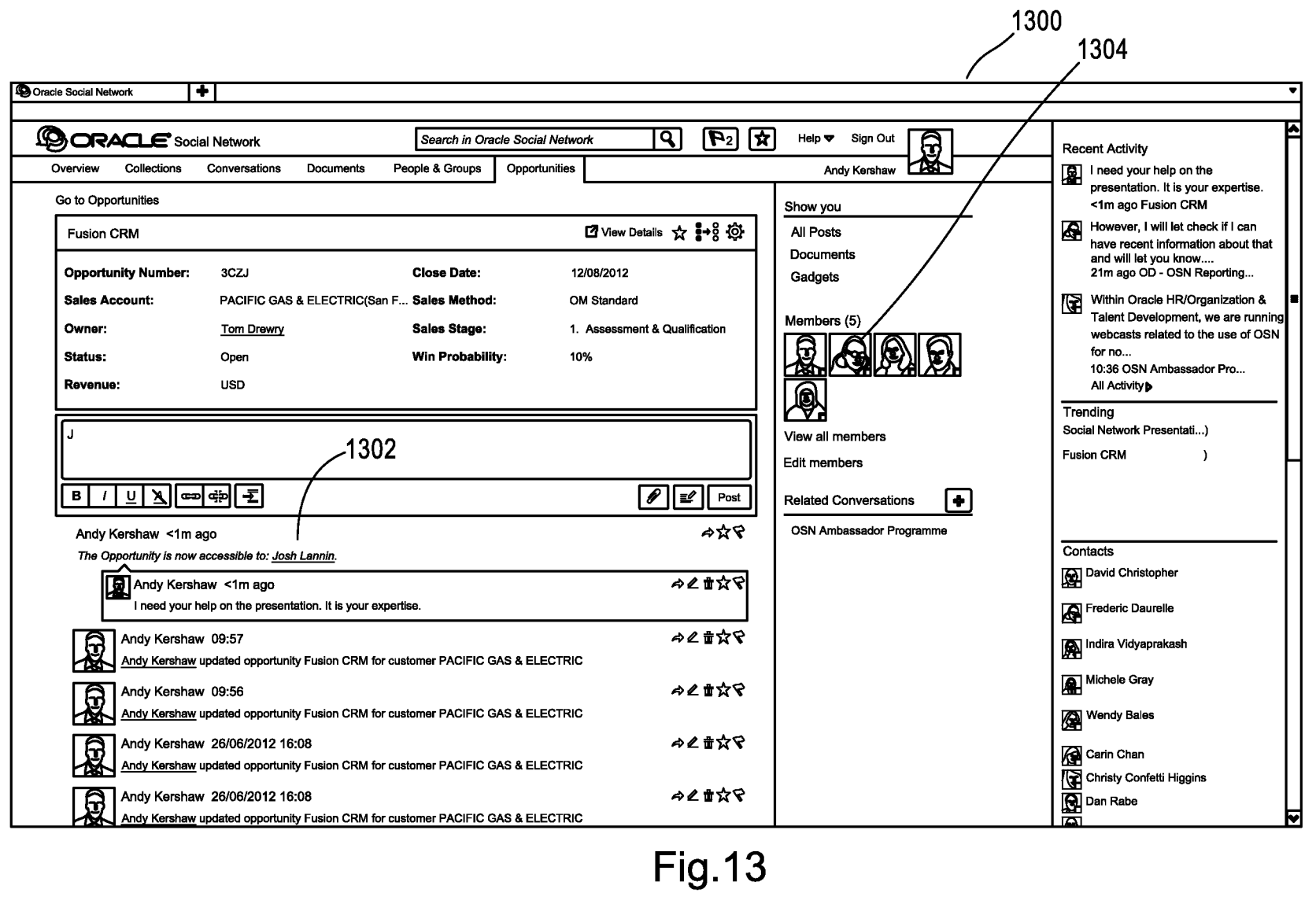

In order to generate the enterprise social graph, and the data underlying the enterprise social graph, a social object is created from the business object, as discussed in conjunction with FIG. 10 above. For example, FIG. 13 is a screenshot showing a social object 1300 that corresponds to business object 1200 of FIG. 12 for the CRM system-of-record. Within social object 1300, more members can be added. For example, at 1302, a new member "Josh Lannin" is added with the comment of "I need your help on the presentation. It is your expertise." This new member will now be part of social object 1300, and included in the generated enterprise social graph, even though he is not a member of the enterprise team for business object 1200. As shown at 1304, social object 1300 includes five members, while business object 1200 at 1208 of FIG. 12 only includes three members. Additional members can be added to social object 1300 directly or through the generation of new related conversations. If business object 1200 is ultimately "won", Josh Lannin's expertise on the presentation can be determined from the enterprise social graph as a contribution/reason for the win. Members can be part of business object 1200 and not social object 1300, and vice versa.

Figure 14:
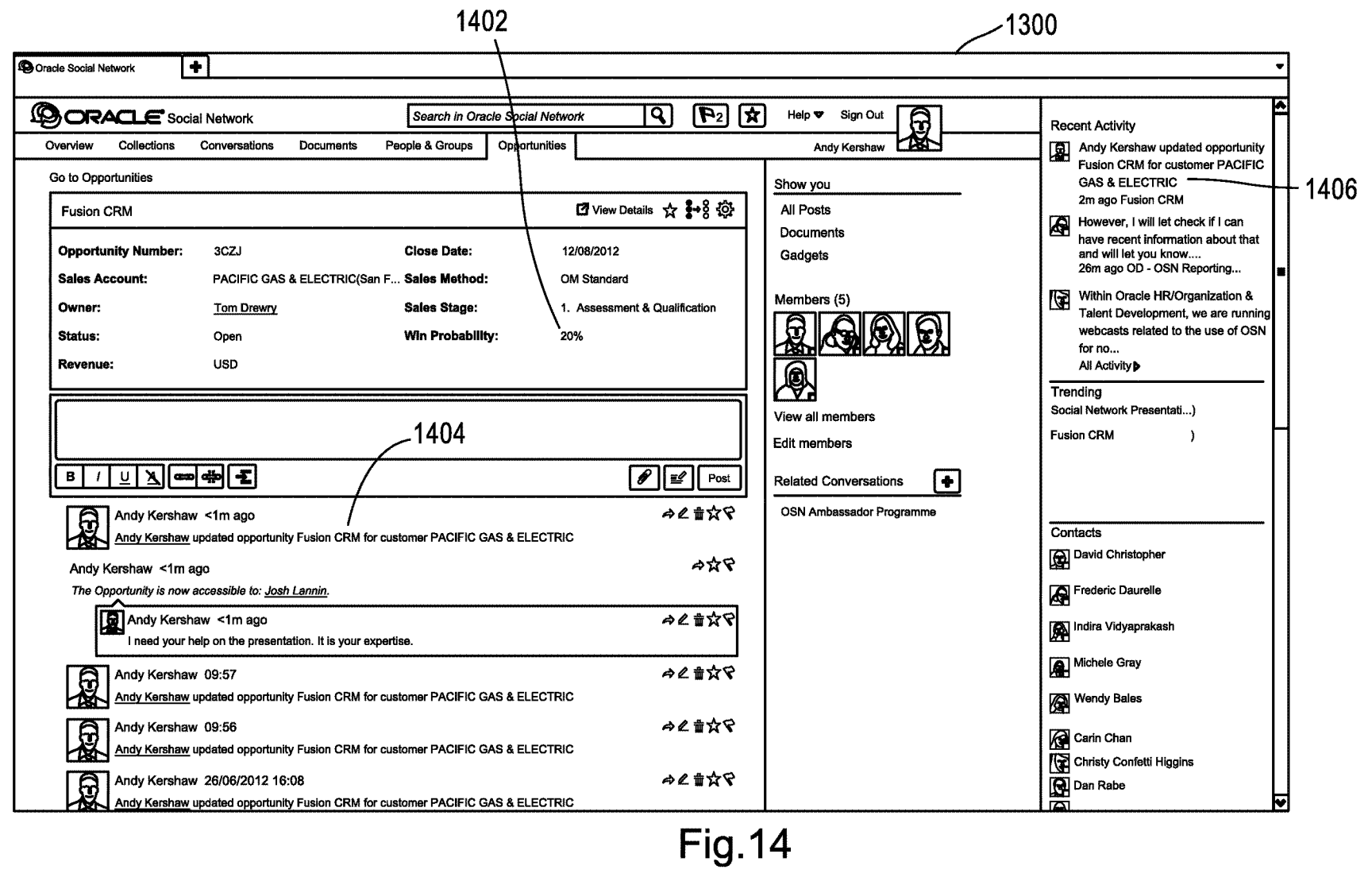

FIG. 14 is a screenshot showing social object 1300 of FIG. 13. As indicated at 1402, 1404 and 1406, the win probability of business object 1200 has been updated from 10% as previously shown in FIG. 13 to 20%. Although updated within social object 1300, the change is reflected in the corresponding business object of FIG. 12 and the system-of-record, as previously discussed. However, the social enterprise graph will enable the change to be correlated to all members of social object 1300, rather than merely the members of business object 1200.

Therefore, social network 100, through the integration with systems-of-record business objects represented as social objects, brings the enterprise defined network into the social graph. For example, the sales team assigned within a CRM application is reflected in the social object within social network 100. The integration model of the social object allows the team defined within the system-of-record to be either expanded on the social object or for specific individuals or groups to be brought into the context through the related conversations. The resulting network of individuals represents the full set of contributors to the progression of the state of the object within the system-of-record.

For example, the network created by the combination of the two graphs (social and enterprise) within social network 100 includes the legal and business practice specialists who are not named members of the CRM defined team but are critical to the successful progression to close of a sales opportunity. The resulting enterprise social graph is calculable against the network within social network 100.

The results or value of content, individuals or groups within the enterprise social graph can be accurately determined by correlation of the enterprise social graph with the underlying system-of-record object that created the initial context for the relationships. For example, the legal specialist that is always part of the network associated with successful financial services deals greater than $2M can be correlated to this business object via membership in the corresponding social object. By correlating the measure of success within a system-of-record result (e.g., the deal is won) with the enterprise social graph generated by the network collaboration associated with the system-of-record, data driven intelligent recommendations can be made either within enterprise applications or social network 100. For example, using the enterprise social network, a decision can be made that the above-mentioned legal specialist should be part of a new sales team for the $2.5M deal with "Big Bank".

Figure 15A:
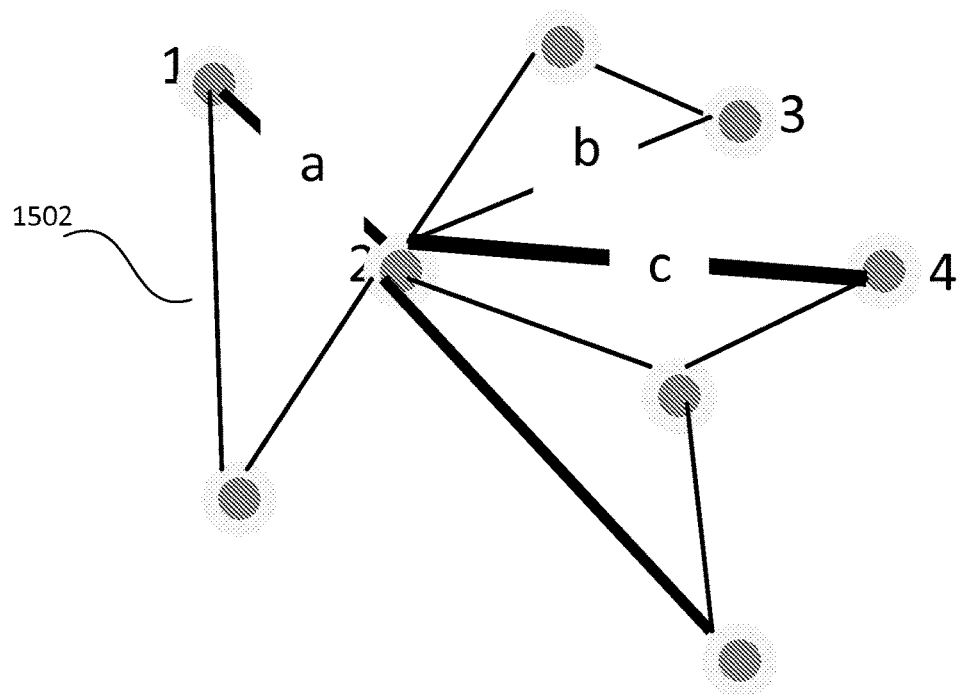
FIGS. 15a and 15b are example network diagrams of enterprise social networks in accordance with embodiments of the present invention.
Figure 15B:
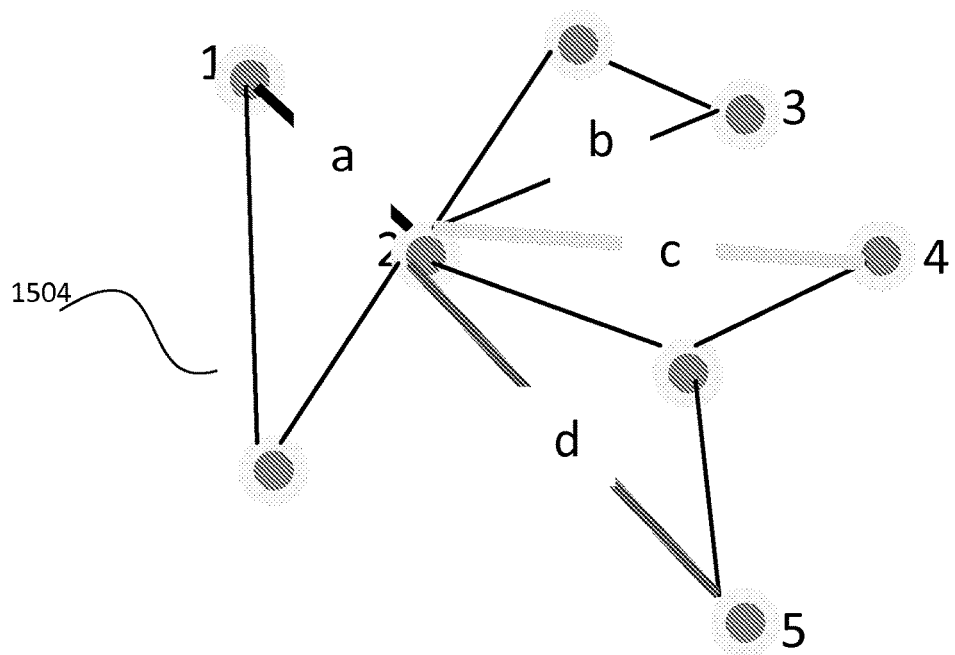

FIGS. 15a and 15b are example network diagrams of enterprise social graphs/networks 1502 and 1504 in accordance with embodiments of the present invention. Each network shows a set of relationships or connections between nodes, where each node can represent a person. In a traditional social graph based only on social network relationships, the connection between nodes of the social graph (where each node may represent a social network member) could be the result of a first member following a second member, or vice versa within the social network. Using still further known collaborative relationships, the connection could be the result of a first member emailing a second member, or vice versa. Further, the connection could be the result of a first member sharing a file with second member, or vice versa.

However, as discussed above, in accordance with embodiments of the present invention, the enterprise application relationships are combined with previously known social network relationships. Therefore, referring to network 1502, the connection "c" of FIG. 15a could be the result of (2) working on a sales opportunity team with (4) in a CRM system, as reflected in a business object. Within social network 100, the connections between individuals that work on the sales opportunity team are not restricted to those defined within the CRM system (i.e., the named sales team) but are extended to those outside of the CRM system within the wider enterprise through the integration of the corresponding social object that allows the broadening of the collaborative access to the opportunity.

Within the enterprise social network graph or diagram that combines the strength of the relationship or connections between nodes, in accordance with embodiments of the present invention, is valuable information. For example, referring again to network 1502, connection "a" has a stronger relative relationship than "b" (as indicated by the thicker line for connection a) because (1) interacts more on the social network with (2) than (2) exchanges emails with (3). Connection "c" is the strongest relative relationship for node (2) as both (2) and (4) are on the same CRM based sales opportunity team which generates the highest level of interaction frequency.

The relationships and their relative strengths produced with the combination of enterprise and social data provides valuable information that can be utilized for traditional network analysis. Embodiments allow for the allocation of a business application result to the network connection. The connection is a result of the full set or extended relationships derived by integrating business applications with the social applications using social objects and correlates the measurable achievement to the full set of relationships that are associated with a business result.

Referring to network 1504, connection "d" is visually represented as a darker/denser color than connections "a" and "b" because the connections between (2) and (5) are based upon sales opportunities, all of which were won within the forecast close date at the forecast value in the CRM system. Connection "d" is derived through the social object integration provided by social network 100 connecting the social object the CRM application. In contrast, connection "c" is a lighter color (while thicker) than connection "d" as the result of connections between (2) and (4) that are also based upon sales opportunities, including some of which were won within the forecast date but were not within the forecast value, some of which were won but were neither at the forecast value or within the forecast date and some which were lost.

Therefore, the information provided by network 1504 in accordance to one embodiment allows a user to infer that while the connection between (2) and (4) may be strongest in terms of frequency, the connection between (2) and (5) has a higher enterprise value as it is the result of more successful enterprise measured achievements. Specifically, a recommendation based on connection "d" is a higher value recommendation to an individual and to their enterprise than connection "c". The derived value form network 1504 can be generated by embodiments of the present invention because of the correlation of business measurable results with member relationships introduced through integrating enterprise applications with the social network using social objects.

One embodiment allows a user to "drill down" to each connection of the enterprise social graph to view the underlying data that forms the connection. FIGS. 16a and 16b illustrate a drilling down of connection "d" of FIG. 15b in accordance with one embodiment of the present invention. Drilling down into connection "d" gives further insight into the nature of the connection and allows for a higher level of targeted recommendation based on the context in which that connection is being used for a recommendation.

Each connection "strand" is made up of multiple "threads", each of which can have a correlation with business results. Referring to FIG. 16a, the connection "strand" "d" between nodes (2) and (5) (nodes can be any object, such as a person or a piece of content) has been formed as an aggregate of "thread" results attributed by the social object integration with enterprise applications, including contribution from threads 1601, 1602, 1603 and 1604. Thread 1601 is from a social relationship (e.g., both nodes are members of the same social object), thread 1602 is from a relationship via a human capital management ("HCM") application, thread 1603 is from a relationship via CRM application, and thread 1604 is from a relationship via an ERP application. Each thread includes a numerical score (e.g., 0.639 for HCM thread 1602). In the example of FIG. 16a, the relatively high CRM score attributed to the connection vs. the relatively low ERP score would encourage a user to recommend node (5) (e.g., the member corresponding to node (5)) based on the connection "d" to node (2) in the context of a sales requirement (i.e., CRM application) but not in the context of a Quarter Close (i.e., an ERP Financials application).

Embodiment allow a user to further drill down into a connection as shown in FIG. 16b. The CRM "strand" within connection "d" has been formed as an aggregate of "thread" results attributed by the social object integration with the CRM sales application. The additional attribute data available through the social object integration allows a further refinement of the recommendation of (5) based on the connection "d" with (2). For example, the high score at 1601 (i.e., 0.892) attributed to Financial Services on large value deals (i.e., greater than $3M) with the specific product (i.e., "Exalogic") allows the recommendation to be made when in similar context whether directly matching or with an inferred similarity (e.g., highly regulated industries but the recommendation is not valid for mid-value, retail sales context).

Figure 17:
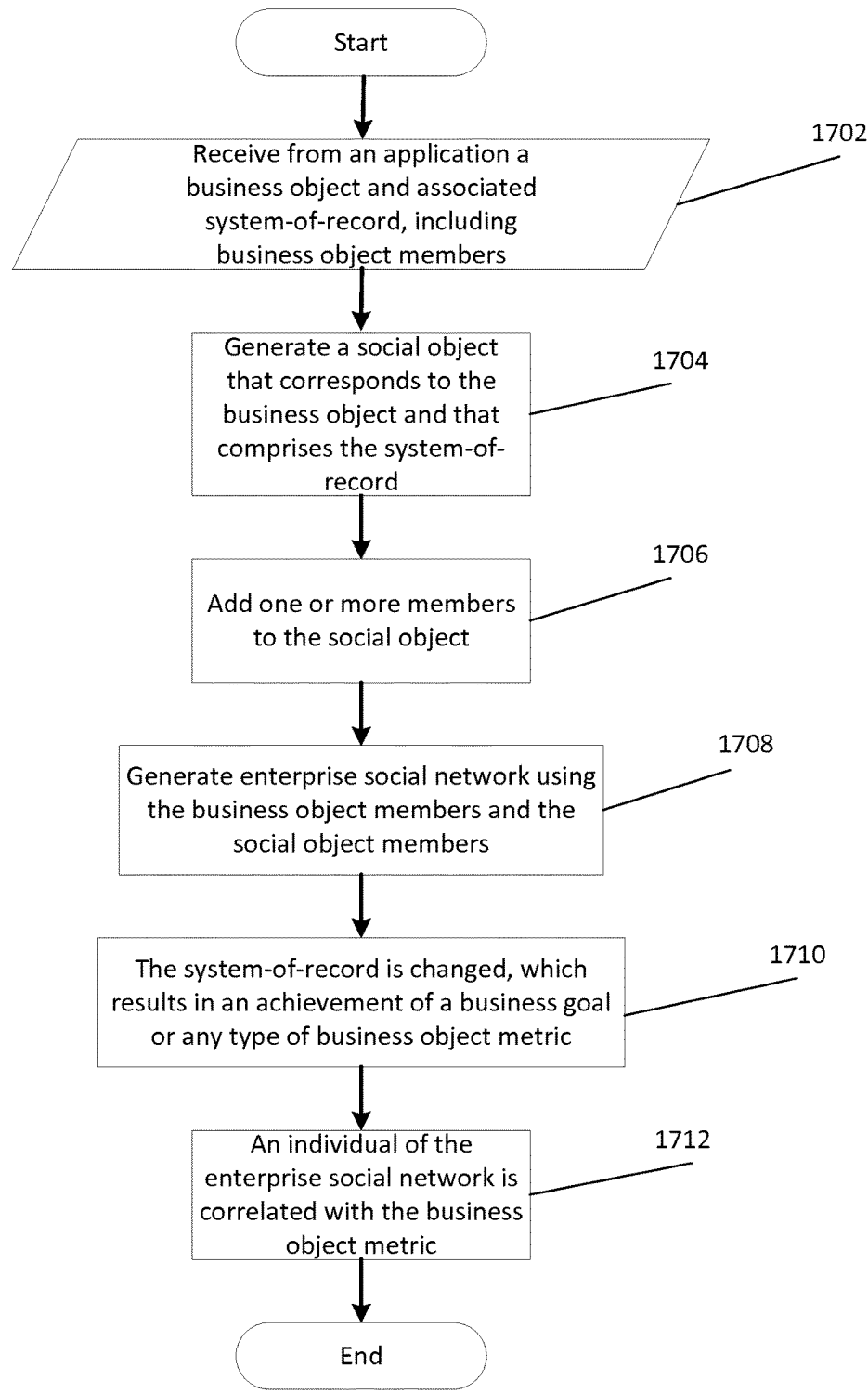
FIG. 17 is a flow diagram of the functionality of the social network module of FIG. 2 when generating an enterprise social graph from a business object of a system-of-record in accordance with one embodiment.

FIG. 17 is a flow diagram of the functionality of social network module 16 of FIG. 2 when generating an enterprise social graph from a business object of a system-of-record and correlating business results with relationships in accordance with one embodiment.

At 1702, a business object for a system-of-record of an enterprise application is received, along with corresponding business object members. The business object includes one or more updatable business goals or metrics, such as whether a sales opportunity was won, and how much revenue was achieved.

At 1704, a social object corresponding to the business of record is generated, as disclosed in conjunction with FIG. 10 above.

At 1706, social object members are added to the social object such as by directly adding new members or through related conversations. The group of individuals the make up the subject object members is different than the group of individuals that make up the business object members. Specifically, the social objects members include the business object members plus additional members.

At 1708, a corroboration type enterprise social network is generated using the business object members and the social object members. The enterprise social network/graph in one embodiment is a collaboration graph where the vertices represent participants of that network and where two distinct participants are joined by an edge whenever there is a collaborative relationship between them of a particular kind. The data forming the graph is stored within social network 100, and the graph may be generated visually on a user interface. In another embodiment, a visual graph is not generated, but the underlying data is generated and stored.

At 1710, the system-of-record is changed, which results in an achievement of a business goal or any type of business object metric.

At 1712, an individual or object of the enterprise social network is correlated with the business object metric.

Therefore, as disclosed, the generation of the enterprise social network allows business driven metrics to be correlated with individuals beyond the members of the business object. Individuals that provide any type of collaboration through the corresponding social object can be identified and correlated with the metrics of the business object.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to correlate business results within a social network, the correlating comprising:

receiving from an enterprise application a business object, associated business object data and corresponding enterprise members, wherein the enterprise members comprise an enterprise team assigned to the business object, and wherein the enterprise application comprises a customer relationship management (CRM) system, and the business object comprises a sales opportunity within the CRM system;

generating a social object for the social network, wherein the social object corresponds to the business object and the business object data and comprises related conversations;

assigning social members to the social object, wherein the social members comprise the enterprise team and additional members of the social network and wherein a set of the social members is different than a set of the enterprise members and at least one of the social members is not a user of the CRM system;

receiving a change in the business object, wherein the change comprises a change to the associated business object data comprising an outcome of the sales opportunity; and correlating the change in the business object to each of the enterprise members and to each of the social members so that each of the social members are associated with the outcome;

wherein the change to the business object data of the enterprise application on a first server is received by the social network on a second server through an application programming interface, and the social network modifies the social object to incorporate the change;

wherein changes to the social object are sent to the first server through the application programming interface, and the business object data of the enterprise application is modified to incorporate the changes.

2. The computer readable medium of claim 1, further comprising:

generating an enterprise social graph comprising a plurality of enterprise social members comprised of a set of both the enterprise members and the social members and comprising a plurality of nodes, each node corresponding to an enterprise social member or an object, and a connection between each of the nodes, wherein the connection reflects a strength of a relationship between the nodes.

3. The computer readable medium of claim 2, wherein the strength is based on a frequency of interaction between the corresponding enterprise social members within the social network.

4. The computer readable medium of claim 2, wherein the strength is based on a frequency of emails between the corresponding enterprise social members.

5. The computer readable medium of claim 2, wherein the strength is based on a frequency of business opportunities that are won and that are correlated with the corresponding enterprise social members.

6. The computer readable medium of claim 5, wherein the strength is further based on a value of the business opportunities.

7. The computer readable medium of claim 2, further comprising generating an image of the enterprise social graph, wherein the strength is represented by a thickness of the connection.

8. The computer readable medium of claim 1, wherein the outcome of the sales opportunity comprises either the sales opportunity is won or lost.

9. The computer readable medium of claim 1, wherein the social object further comprises a wall that shows a history of all changes of the social object.

10. A method of correlating business results within a social network, the correlating comprising:
receiving from an enterprise application a business object, associated business object data and corresponding enterprise members, wherein the enterprise members comprise an enterprise team assigned to the business object, and wherein the enterprise application comprises a customer relationship management (CRM) system, and the business object comprises a sales opportunity within the CRM system;
generating a social object for the social network, wherein the social object corresponds to the business object and the business object data and comprises related conversations;
assigning social members to the social object, wherein the social members comprise the enterprise team and additional members of the social network and wherein a set of the social members is different than a set of the enterprise members and at least one of the social members is not a user of the CRM system;
receiving a change in the business object, wherein the change comprises a change to the associated business object data comprising an outcome of the sales opportunity; and
correlating the change in the business object to each of the enterprise members and to each of the social members so that each of the social members are associated with the outcome;
wherein the change to the business object data of the enterprise application on a first server is received by the social network on a second server through an application programming interface, and the social network modifies the social object to incorporate the change;
wherein changes to the social object are sent to the first server through the application programming interface, and the business object data of the enterprise application is modified to incorporate the changes.

11. The method of claim 10, wherein the outcome of the sales opportunity comprises either the sales opportunity is won or lost.

12. The method of claim 10, further comprising:
generating an enterprise social graph comprising a plurality of enterprise social members comprised of a set of both the enterprise members and the social members and comprising a plurality of nodes, each node corresponding to an enterprise social member or an object, and a connection between each of the nodes, wherein the connection reflects a strength of a relationship between the nodes.

13. The method of claim 12, wherein the strength is based on a frequency of interaction between the corresponding enterprise social members within the social network.

14. The method of claim 12, wherein the strength is based on a frequency of emails between the corresponding enterprise social members.

15. The method of claim 12, wherein the strength is based on a frequency of business opportunities that are won and that are correlated with the corresponding enterprise social members.

16. The method of claim 15, wherein the strength is further based on a value of the business opportunities.

17. The method of claim 12, further comprising generating an image of the enterprise social graph, wherein the strength is represented by a thickness of the connection.

18. A social network comprising:
a processor;
a storage device coupled to the processor and storing instructions, the instructions when executed by the processor implementing modules;
a business object, associated business object data and corresponding identities of enterprise members received from an enterprise application and stored on the storage device, wherein the enterprise members comprise an enterprise team assigned to the business object, and wherein the enterprise application comprises a customer relationship management (CRM) system, and the business object comprises a sales opportunity within the CRM system;
a social object generation module implemented by the processor that generates a social object for the social network, wherein the social object corresponds to the business object and the business object data and comprises related conversations and assigns identities of social members to the social object, wherein the social members comprise the enterprise team and additional members of the social network and wherein a set of the social members is different than a set of the enterprise members and at least one of the social members is not a user of the CRM system;
a correlation module implemented by the processor that receives a change in the business object, wherein the change comprises a change to the associated business object data comprising an outcome of the sales opportunity, and correlates the change in the business object to each of the enterprise members and to each of the social members so that each of the social members are associated with the outcome;
wherein the change to the business object data of the enterprise application on a first server is received by the social network on a second server through an application programming interface, and the social network modifies the social object to incorporate the change;
wherein changes to the social object are sent to the first server through the application programming interface, and the business object data of the enterprise application is modified to incorporate the changes.

19. A social network of claim 18, further comprising:
a graph generator that generates an enterprise social graph comprising a plurality of enterprise social members comprised of a set of both the enterprise members and the social members and comprising a plurality of nodes, each node corresponding to an enterprise social member or an object, and a connection between each of the nodes, wherein the connection reflects a strength of a relationship between the nodes.

20. The social network of claim 19, wherein the strength is based on a frequency of interaction between the corresponding enterprise social members within the social network.

21. The social network of claim 19, wherein the strength is based on a frequency of business opportunities that are won and that are correlated with the corresponding enterprise social members.

22. The social network of claim 18, wherein the outcome of the sales opportunity comprises either the sales opportunity is won or lost.

23. The social network of claim 18, wherein the social object further comprises a wall that shows a history of all changes of the social object.

* * * * *

UNITED STATES PATENT AND TRADEMARK OFFICE
CERTIFICATE OF CORRECTION

PATENT NO. : 9,619,845 B2  Page 1 of 1
APPLICATION NO. : 13/716779
DATED : April 11, 2017
INVENTOR(S) : Chakraborty et al.

It is certified that error appears in the above-identified patent and that said Letters Patent is hereby corrected as shown below:

On the Title Page

On page 2, Column 2, under Other Publications, Line 53, delete "Connectins" and insert -- Connections --, therefor.

On page 2, Column 2, under Other Publications, Lines 63-65, below "May 30, 2012" delete "Microsoft Online Services; "Enhancing Collaboration and Increasing Innovation with Social Computing"; Microsoft Corporation: Feb. 2009.".

In the Specification

In Column 4, Line 11, delete "and or" and insert -- and/or --, therefor.

In Column 6, Line 47, after "FIG. 4" insert -- . --.

Signed and Sealed this
Third Day of October, 2017

Joseph Matal
*Performing the Functions and Duties of the*
*Under Secretary of Commerce for Intellectual Property and*
*Director of the United States Patent and Trademark Office*